US009853571B2

(12) United States Patent
Liu et al.

(10) Patent No.: US 9,853,571 B2
(45) Date of Patent: Dec. 26, 2017

(54) SECONDARY CONTROL METHOD AND APPARATUS OF PARALLEL INVERTERS IN MICRO GRID

(71) Applicant: Delta Electronics (Shanghai) Co.,Ltd., Shanghai (CN)

(72) Inventors: Jinjun Liu, Shaanxi (CN); Teng Wu, Shaanxi (CN); Zeng Liu, Shaanxi (CN); Shike Wang, Shaanxi (CN); Baojin Liu, Shaanxi (CN); Yong Tao, Shaanxi (CN)

(73) Assignee: DELTA ELECTRONICS (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 15/452,690

(22) Filed: Mar. 7, 2017

(65) Prior Publication Data
US 2017/0264213 A1    Sep. 14, 2017

(30) Foreign Application Priority Data

Mar. 11, 2016  (CN) .......................... 2016 1 0140985
Jan. 19, 2017  (CN) .......................... 2017 1 0044038

(51) Int. Cl.
*H02M 7/537*   (2006.01)
*H02M 1/42*    (2007.01)

(52) U.S. Cl.
CPC ............. *H02M 7/537* (2013.01); *H02M 1/42* (2013.01)

(58) Field of Classification Search
CPC ........ H02M 7/49; H02M 7/493; H02M 7/537; H02M 1/42; H02M 3/156–3/158; H02M 3/285
USPC ....... 363/71, 73–83; 318/438, 729, 801, 811
See application file for complete search history.

(56) References Cited

FOREIGN PATENT DOCUMENTS

| CN | 103001247 B   | 9/2014  |
| CN | 104410097 A   | 3/2015  |
| CN | 104901334 A   | 9/2015  |
| EP | 2940826 A1    | 11/2015 |
| WO | 2013/087085 A1| 6/2013  |
| WO | 2015/075923 A1| 5/2015  |

*Primary Examiner* — Yemane Mehari
(74) *Attorney, Agent, or Firm* — CKC Partners Co., Ltd.

(57) ABSTRACT

The present invention discloses a secondary control method and apparatus of parallel inverters in a micro grid, comprising: generating frequency and amplitude of fundamental voltage in the voltage instruction of inverter by droop control according to output voltage and output current of inverter to obtain a fundamental voltage instruction value; extracting voltage values and current values of a first and second AC signals from output voltage and output current of inverter, generating frequency instruction values of the first and second AC signals by droop control to obtain voltage instruction values of the first and second AC signals; regulating the output voltage of inverter according to the voltage instruction value of the first AC signal, the voltage instruction value of the second AC signal and the fundamental voltage instruction value.

20 Claims, 16 Drawing Sheets

SECONDARY CONTROL METHOD AND APPARATUS OF PARALLEL INVERTERS IN MICRO GRID

CROSS-REFERENCE TO RELATED APPLICATIONS

This non-provisional application claims priority under 35 U.S.C. §119(a) on Patent Application No. 201610140985.7 and 201710044038.2 filed in P.R. China on Mar. 11, 2016 and Jan. 19, 2017, the entire contents of which are hereby incorporated by reference.

Some references, if any, which may include patents, patent applications and various publications, may be cited and discussed in the description of this invention. The citation and/or discussion of such references, if any, is provided merely to clarify the description of the present invention and is not an admission that any such reference is "prior art" to the invention described herein. All references listed, cited and/or discussed in this specification are incorporated herein by reference in their entireties and to the same extent as if each reference was individually incorporated by reference.

FIELD OF THE INVENTION

The present invention belongs to the field of coordinated control of parallel inverters in a micro grid, and specifically relates to a wireless secondary control method and apparatus of parallel inverters in a micro grid based on AC small-signals.

DISCUSSION OF THE RELATED ART

With the growing environmental and energy crises, more and more attentions have been drawn to the concept of "micro grid" which has been applied in more and more applications. A micro grid is an energy system in which distributed generation units and interconnected loads are incorporated. In most cases, a micro grid is connected to a bus via power-electronics interfaces, such as inverters. Therefore, the coordinated control among parallel inverters is one of the key factors that enable a micro grid to be operated stably and efficiently.

Due to the geographical dispersion of distributed generation units, it is not a better way to transmit signals among parallel generation units through communication lines, because costs will be increased and the noise on the lines will affect the quality of communication. In this case, the application of droop control technology may allow the power sharing among parallel generation units without the use of communication lines. Droop control technology regulates active power and reactive power, respectively, using the frequency and voltage amplitude, which is a common method for power distribution.

However, droop control may also induce some problems, such as instability caused by the coupling among power controls, poor sharing of reactive power, and the deviation of frequency and voltage amplitude. Among them, the deviation of frequency or voltage amplitude is caused by the inherent compromise between the power sharing and the frequency or voltage adjustment rate. To solve this problem, secondary control has been widely applied. Many studies aim to eliminate the deviation of frequency and voltage amplitude caused by the droop control technology through the secondary control.

Some literatures propose a method of synchronically sending compensation instructions of frequency and voltage amplitude to parallel inverters using a central controller. The central controller collects the voltage and current information from each inverter, calculates a uniform compensation signal of voltage amplitude and frequency, and sends the signal to each inverter through interconnected lines so as to synchronically compensate for the deviation of frequency and voltage amplitude among the inverters. However, the use of the interconnected lines and the central controller may increase the system complexity, and reduces the system reliability. Therefore, the entire system would not be able to operate once the central controller does not work.

Other literatures propose a method of replacing the central controller with distributed controllers to improve the system reliability, as shown in FIG. 1. A local controller for each inverter collects the frequency and voltage amplitude information of all the inverters in the system for secondary control, thereby compensating for the deviation of frequency and voltage amplitude. Although such conventional distributed secondary control improves the system reliability, an integrator is used in the controller of parallel inverters. Actually, differences in parameters of the controller will result in different stable operating points of the inverters, thereby affecting the power sharing characteristics. Besides, the application of communication lines limits the distribution of geographical locations of the inverters, thereby increasing costs and reducing the anti-interference performance. Accordingly, a wireless secondary control strategy will be more competitive.

Some other literatures propose a controllable droop location method, which can automatically adjust the droop bias of a master inverter according to the load power so that the master inverter may handle the variation of the load power, thereby achieving the restoration of the frequency and voltage amplitude. However, this method places high demands on the power capacity of the master inverter, which is not practical in engineering applications.

Some other literatures (such as CN104901334A) propose that the droop bias of all the slave inverters in the master-slave control system may be calculated on-line by estimating the load power, thereby adjusting the output power of the slave inverters. In this way, most of the load power can be shared among the salve inverters while the frequency and voltage amplitude is restored. Although this method does not place much demand on the power capacity of the master inverter, it overcomes the problem of synchronization among parallel inverters by using blind areas. However, the adjustment process is slow and is not applicable for the case where the loads changes rapidly. Besides, this method requires the control parameters of all the inverters in the system to be stored in the controller for each inverter. Therefore, when a certain inverter is added to or removed from the system, the parameters of other inverters need to be modified accordingly, which is cumbersome.

SUMMARY

In order to overcome the above-mentioned problems existing in the prior art, the present invention provides a secondary control method of parallel inverters in a micro grid, comprising:

Step 1: generating a frequency instruction value and an amplitude instruction value of a fundamental voltage in the voltage instructions of the inverter by using a droop control according to an output voltage and an output current of the inverter, so as to obtain a fundamental voltage instruction value $V_{fund}$;

Step 2: extracting current values of a first AC signal and a second AC signal from the output current of the inverter, extracting voltage values of the first AC signal and the second AC signal from at least one voltage signal, generating a frequency instruction value of the first AC signal by using the droop control so as to obtain a voltage instruction value $\hat{v}_p^*$ of the first AC signal, and generating a frequency instruction value of the second AC signal by using the droop control so as to obtain a voltage instruction value $\hat{v}_p^*$ of the second AC signal; and Step 3: regulating the output voltage of the inverter according to the voltage instruction value $\hat{v}_p^*$ of the first AC signal, the voltage instruction value $\hat{v}_p^*$ of the second AC signal, and the fundamental voltage instruction value $V_{fund}$.

The present invention further provides a secondary control apparatus of parallel inverters in a micro grid, comprising:

a fundamental voltage instruction value generation module, for generating a frequency instruction value and an amplitude instruction value of the fundamental voltage in the voltage instructions of the inverter by using a droop control according to an output voltage and an output current of the inverter, so as to obtain a fundamental voltage instruction value $V_{fund}$;

an AC signal voltage instruction value generation module, for extracting current values of a first AC signal and a second AC signal from the output current of the inverter, extracting voltage values of the first AC signal and the second AC signal from at least one voltage signal, generating a frequency instruction value of the first AC signal by using the droop control so as to obtain a voltage instruction value $\hat{v}_p^*$ of the first AC signal, and generating a frequency instruction value of the second AC signal by using the droop control so as to obtain a voltage instruction value $\hat{v}_p^*$ of the second AC signal; and a regulation module, for regulating the output voltage $V_{abc}$ of the inverter according to the voltage instruction value $\hat{v}_p^*$ of the first AC signal, the voltage instruction value $\hat{v}_p^*$ of the second AC signal, and the fundamental voltage instruction value $V_{fund}$.

With respect to the prior art, the present invention has the following effects: the wireless secondary control method and apparatus of parallel inverters in a micro grid according to the present invention aims to provide a solution for the compromise between the power sharing and the voltage regulation rate in the droop-controlled inverters. The core idea is to extract voltage values and current values of AC signals from the output voltage and output current of the inverters, and to adjust the droop bias of fundamental voltage dynamically by controlling the frequency of the AC signal. Accordingly, the inverters may automatically adjust the droop bias itself, so that they can change their output power so as to facilitate restoring the system frequency and voltage amplitude and to eliminate the bias in frequency and voltage amplitude caused by droop control effectively. Moreover, since the frequency of AC signals generated by each inverter in a stable status is identical, the droop bias of fundamental voltages of each inverter is identical. Accordingly, the output active power and reactive power becomes identical, which may implement power sharing automatically and quickly independent of communication lines.

DETAILED DESCRIPTION OF THE INVENTION

A preferred embodiment is used herein to further describe the detailed contents and technical description of the present invention, but should not be construed as limiting the implementation of the present invention.

Figure 1:
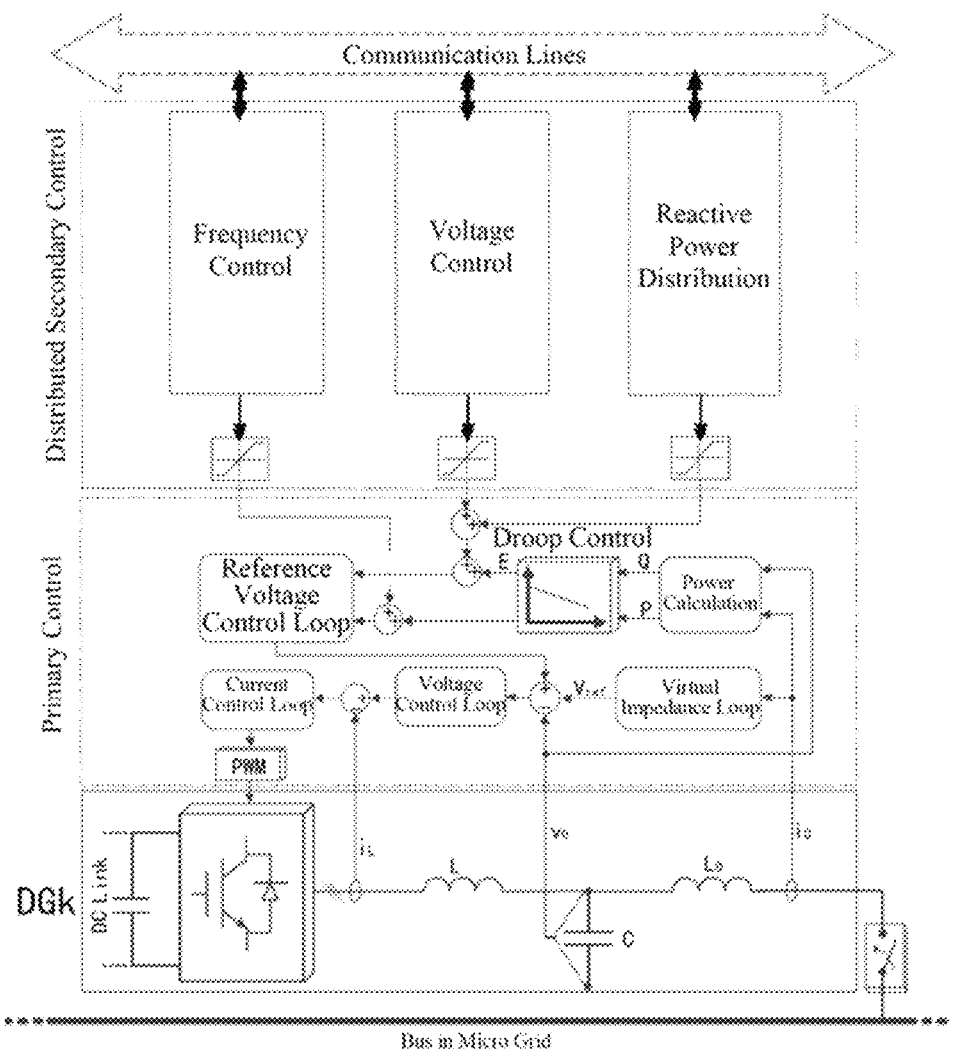
FIG. 1 is a control block diagram of a conventional distributed secondary control method.
Figure 2:
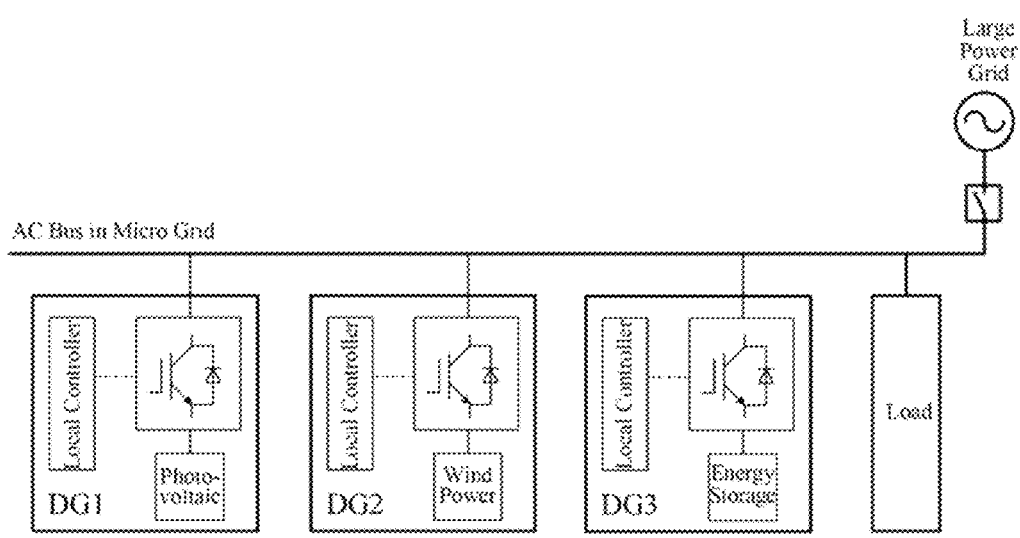
FIG. 2 is a topological structural view of a parallel inverter system in micro grid.

With reference to FIG. 2, FIG. 2 is a topological structural view of a parallel inverter system in micro grid. In this system, inverters are indispensable for the energy conversion of each distributed generation (DG) unit. Each inverter has its own local controller. The secondary control method according to the present invention is embedded into the local controller of each inverter, and is especially applied to micro grid running in an island mode.

Figure 3:
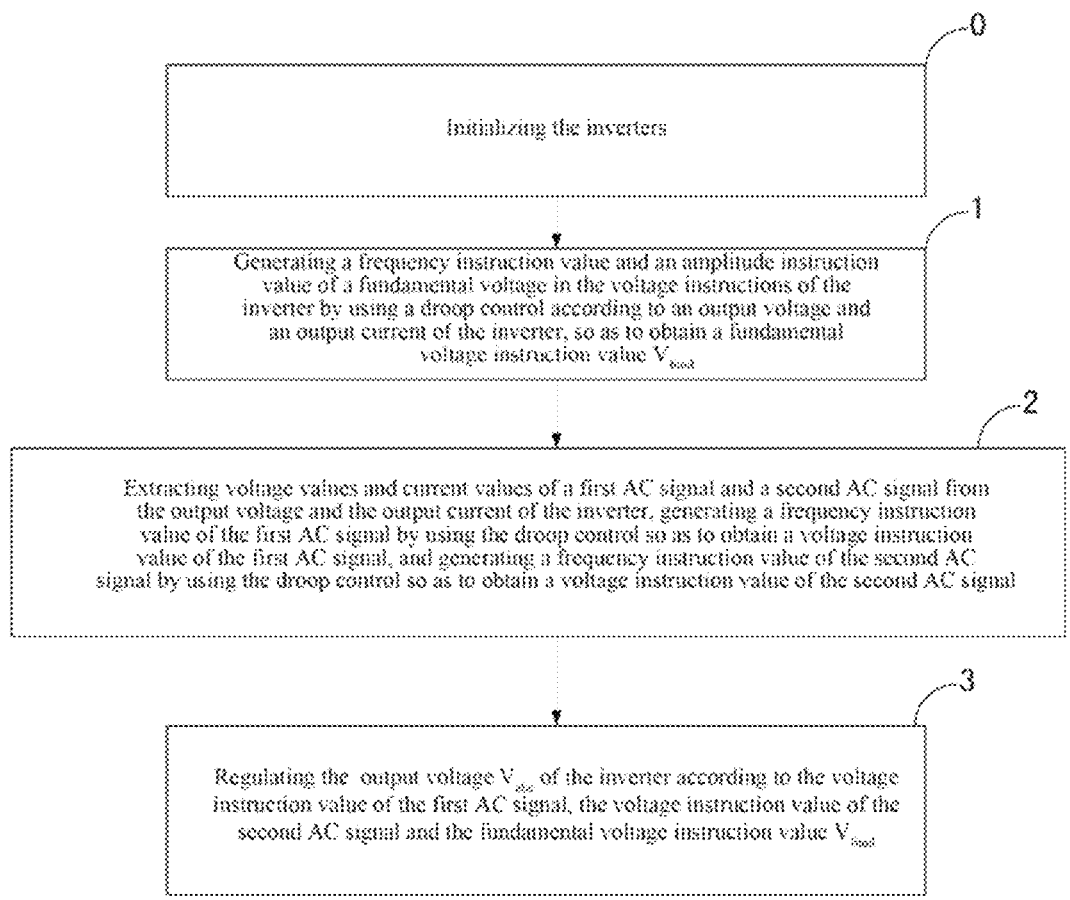
FIG. 3 is a flowchart of a secondary control method of the parallel inverters in micro grid according to the first embodiment of the present invention.
Figure 4:
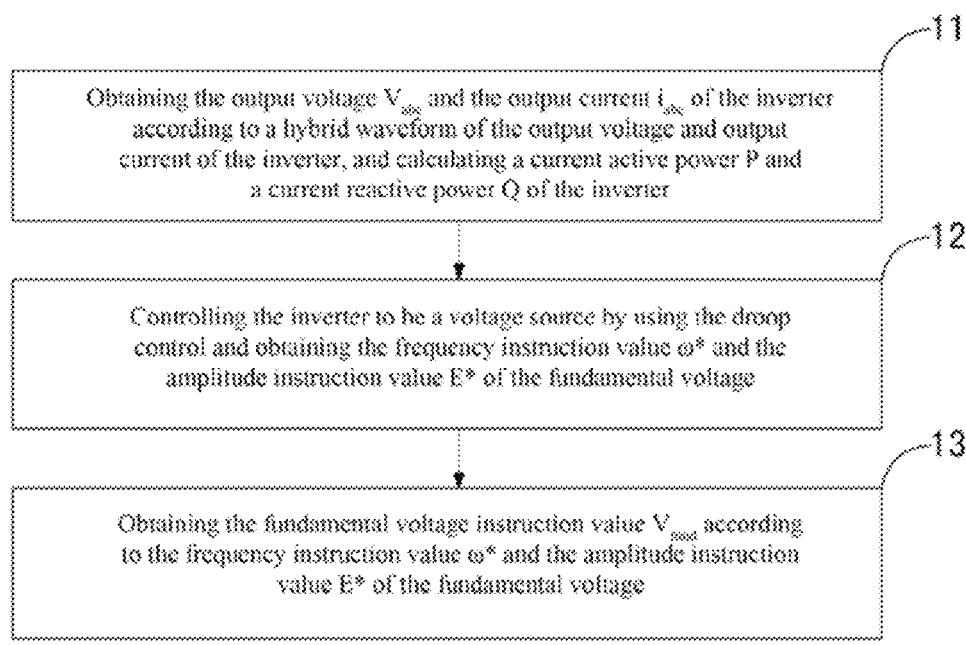
FIG. 4 is a flowchart of sub-steps of step 1 of the secondary control method according to the first embodiment of the present invention.
Figure 5:
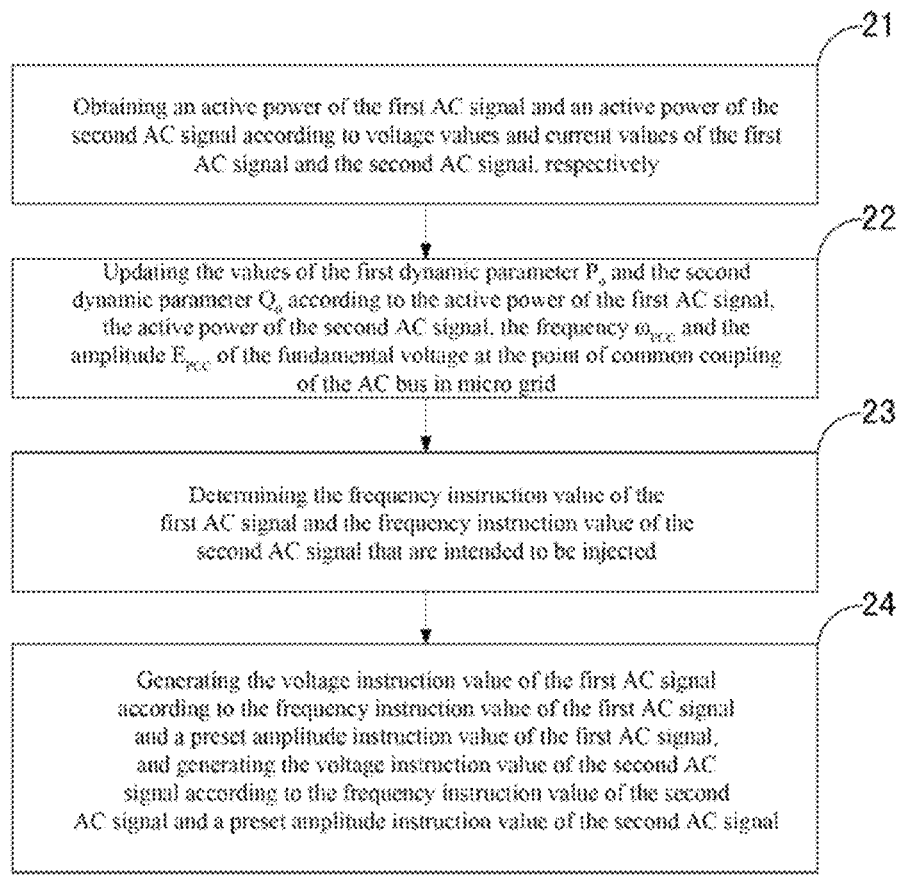
FIG. 5 is a flowchart of sub-steps of step 2 of the secondary control method according to the first embodiment of the present invention.

With reference to FIGS. 3 to 5, FIG. 3 is a flowchart of a secondary control method of the parallel inverters in micro grid according to the first embodiment of the present invention; FIG. 4 is a flowchart of sub-steps of step 1 of the secondary control method according to the first embodiment of the present invention; and FIG. 5 is a flowchart of sub-steps of step 2 of the secondary control method according to the first embodiment of the present invention. For each inverter in the micro grid, the secondary control is performed by using the secondary control method according to the present invention.

As shown in FIGS. 3 to 5, the secondary control method of the parallel inverters in micro grid according to the present invention comprises:

Step 1: generating a frequency instruction value and an amplitude instruction value of a fundamental voltage in the voltage instructions of the inverter by using a droop control according to an output voltage and an output current of the inverter, so as to obtain a fundamental voltage instruction value $V_{fund}$;

Step 2: extracting voltage values and current values of a first AC signal and a second AC signal from the output voltage and the output current of the inverter, generating a frequency instruction value of the first AC signal by using the droop control so as to obtain a voltage instruction value $\hat{v}_p^*$ of the first AC signal, and generating a frequency instruction value of the second AC signal by using the droop control so as to obtain a voltage instruction value $\hat{v}_p^*$ of the second AC signal; and Step 3: regulating the output voltage $V_{abc}$ of the inverter according to the voltage instruction value $\hat{v}_p^*$ of the first AC signal, the voltage instruction value $\hat{v}_p^*$ of the second AC signal, and the fundamental voltage instruction value $V_{fund}$.

Further, the secondary control method of parallel inverters in micro grid according to the present invention further comprises a Step 0 prior to said Step 1, as described below.

Step 0: initializing the inverters, i.e., setting an initial value of a first dynamic parameter $P_0$, an initial value of a second dynamic parameter $Q_0$, an initial frequency $\omega_0$ and an initial voltage $E_0$, respectively, wherein the first dynamic parameter $P_0$ is a droop bias for generating the frequency of the fundamental voltage, and the second dynamic parameter $Q_0$ is a droop bias for generating the amplitude of the fundamental voltage, wherein the initial values of the first dynamic parameter $P_0$ and the second dynamic parameter $Q_0$ are only used in Step 1 and Step 2 which are performed for the first time.

Furthermore, said Step 1 of the secondary control method may further comprise:

Step 11: obtaining the output voltage $V_{abc}$ and the output current $i_{abc}$ of the inverter according to a hybrid waveform of the output voltage and output current of the inverter, and calculating a current active power P and a current reactive power Q of the inverter;

Step 12: controlling the inverter to be a voltage source by using the droop control and obtaining the frequency instruction value $\omega^*$ and the amplitude instruction value $E^*$ of the fundamental voltage by using the following formulae:

$$\omega^* = \omega_0 - m \cdot (P - P_0),$$

$$E^* = G_{jE}((E_0 - E_{pcc}) - n \cdot (Q - Q_0)),$$

wherein m and n are the slopes of droop control lines and are both positive numbers; $G_{iE}$ is a regulator which may be an integral controller, a proportional-integral controller, or a controller having the similar regulating characteristics; $E_{PCC}$ is an amplitude of the fundamental voltage at a point of common coupling (PCC) of the AC bus in micro grid, and in a case where the line impedance matches, the calculating formula for the amplitude instruction value $E^*$ of the fundamental voltage in Step 12 may be simplified to the following formulae:

$$E^* = E_0 - n \cdot (Q - Q_0);\text{ and}$$

Step 13: obtaining the fundamental voltage instruction value $V_{fund}$ according to the frequency instruction value $\omega^*$ and the amplitude instruction value $E^*$ of the fundamental voltage, by using the following formula:

$$v_{fund} = E^* \cos \omega^* t.$$

Furthermore, said Step 2 of the secondary control method may further comprise:

Step 21: obtaining an active power $\hat{P}_p$ of the first AC signal and an active power $\hat{P}_q$ of the second AC signal, respectively, according to voltage values and current values of the first AC signal and the second AC signal, wherein if this step is performed for the first time, both $\hat{P}_p$ and $\hat{P}_q$ are initialized into zero;

Step 22: updating the values of the first dynamic parameter $P_0$ and the second dynamic parameter $Q_0$ according to the active power $\hat{P}_p$ of the first AC signal, the active power $\hat{P}_q$ of the second AC signal, the frequency $\omega_{PCC}$ and the amplitude $E_{PCC}$ of the fundamental voltage at the point of common coupling (PCC) of the AC bus in micro grid, for example, by using the following formulae:

$$P_0 = k_{p\omega}(\omega_r - \omega_{PCC}) + \frac{1}{k_{i\omega}} \int (\omega_r - \omega_{PCC})dt + G_p \hat{P}_p,$$

$$Q_0 = k_{pE}(E_r - E_{PCC}) + \frac{1}{k_{iE}} \int (E_r - E_{PCC})dt + G_q \hat{P}_q,$$

wherein both the frequency and amplitude of the fundamental voltage of the AC bus in micro grid are controlled by a PI controller (Proportional Integral Controller); $\omega_r$ and $E_r$ are a rated frequency and a rated voltage amplitude, respectively, when the output of the inverter reaches a stable status; $k_{p\omega}$, $k_{i\omega}$, $k_{pE}$ and $k_{iE}$ are the parameters of the PI controller; $G_p$ and $G_q$ are preset values, $G_p$ being a gain from the active power of the first AC signal to the first dynamic parameter $P_0$, and $G_q$ being a gain from the active power of the second AC signal to the second dynamic parameter $Q_0$.

It is noted that the orders of magnitudes of $G_p\hat{P}_p$ and $G_q\hat{P}_q$ are set to be the same as the orders of magnitudes of the dynamic parameters $P_0$ and $Q_0$. $\omega_{PCC}$ and $E_{PCC}$ are obtained by extracting the frequency and the voltage amplitude from the voltage $V_{PCC}$ collected at the point of common coupling (PCC).

Since the frequency of the fundamental voltage on the same line is identical, $\omega_{PCC}$ can be replaced by the frequency instruction value $\omega^*$ of the fundamental voltage of the inverter. When the line is short, the amplitude of the fundamental voltage at the point of common coupling (PCC) is approximately equivalent to the fundamental amplitude instruction value $E^*$ of the output voltage of the inverter. Therefore, the first dynamic parameter $P_0$ and the second dynamic parameter $Q_0$ may also be updated by using the following formulae:

$$P_0 = k_{p\omega}(\omega_r - \omega^*) + \frac{1}{k_{i\omega}} \int (\omega_r - \omega^*)dt + G_p \hat{P}_p;$$

$$Q_0 = k_{pE}(E_r - E^*) + \frac{1}{k_{iE}} \int (E_r - E^*)dt + G_q \hat{P}_q$$

Step 23: determining the frequency instruction value $\hat{\omega}_p^*$ of the first AC signal and the frequency instruction value $\hat{\omega}_q^*$ of the second AC signal that are intended to be injected, by using the following formulae:

$$\hat{\omega}_p^* = \hat{\omega}_{p0} - \hat{m} \cdot P_0,$$

$$\hat{\omega}_q^* = \hat{\omega}_{q0} - \hat{n} \cdot Q_0,$$

wherein $\hat{\omega}_{p0}$ and $\hat{\omega}_{q0}$ are preset frequency base values of the first AC signal and the second AC signal respectively, which cannot be identical in the same system, but must be higher than the fundamental frequency of the system. For example, $\hat{\omega}_{p0}$ and $\hat{\omega}_{q0}$ may be 100 Hz and 200 Hz respectively, but the present invention is not limited thereto. $\hat{m}$ and $\hat{n}$ are droop slopes of the first AC signal and the second AC signal respectively, and are both positive numbers; and Step 24: generating the voltage instruction value $\hat{v}_p^*$ of the first AC signal according to the frequency instruction value $\hat{\omega}_p^*$ of the first AC signal and a preset amplitude instruction value $\hat{E}$ of the first AC signal, and generating the voltage instruction value $\hat{v}_q^*$ of the second AC signal according to the frequency instruction value $\hat{\omega}_q^*$ of the second AC signal and a preset amplitude instruction value $\hat{E}$ of the second AC signal, by using the following formulae:

$$\hat{v}_p^* = \hat{E} \cos \hat{\omega}_p^* t,$$

$$\hat{v}_q^* = \hat{E} \cos \hat{\omega}_q^* t,$$

wherein $\hat{E}$ is a preset amplitude instruction value of the first AC signal and the second AC signal.

There is a compromise among the amplitude values of the AC small-signals. If the amplitude value is too large, a serious distortion may occur in the output voltage. On the other hand, if the amplitude value is too small, it is hard to separate and extract the AC small-signals due to the interference and harmonic waves in the system. In this embodiment, the preset amplitude instruction value $\hat{E}$ is identical for the first AC signal and the second AC signal, i.e., being 1% of the amplitude of the fundamental rated voltage, such as, 2V. But the present invention is not limited thereto. In other embodiments, other appropriate values may be applied, as long as the values are approximately 1% of amplitude of the fundamental rated voltage.

Step 2 of extracting the first AC signal and the second AC signal may be specifically implemented as follows: performing a dq conversion on the hybrid waveform of the output voltage and output current of the inverter by using the frequencies of the first AC signal and the second AC signal, respectively; filtering out the AC fundamental signal by using a low-pass filter; and obtaining the remaining DC signal to be as the signal in the dq coordinate system for the required AC signal. This method is simple but less accurate. Alternately, another method may be used to extract the first AC signal and the second AC signal, i.e., performing a dq conversion on the hybrid waveform of the output voltage and output current of the inverter by using the fundamental frequency; filtering out the first AC signal and the second AC signal by using a low-pass filter to obtain a fundamental signal; and subtracting the obtained fundamental signal from the original hybrid signal to obtain the first AC signal and the second AC signal. By comparison, this method is more complicated but more accurate. There are many methods for extracting two AC signals. Only two of them are enumerated in the present invention. However, those skilled in the art may understand that the present invention is not limited thereto. Note that the above is only a simple description of the methods for extracting the first AC signal and the second AC signal, details of which belong to the prior art and are not described here.

In an alternative embodiment, Step 3 further comprises:

Step 31: obtaining a voltage instruction value $v^*_{ref}$ of the inverter according to the voltage instruction value $\hat{v}_p^*$ of the first AC signal, the voltage instruction value $\hat{v}_q^*$ of the second AC signal, and the fundamental voltage instruction value $V_{fund}$, and obtaining a voltage regulation instruction value $v_{ref}$ by applying a voltage closed-loop regulation on $v^*_{ref}$, so as to regulate the output voltage $V_{abc}$ of the inverter, wherein $v^*_{ref}$ may be obtained by using the following formula:

$$v^*_{ref} = v_{fund} + \hat{v}_p^* + \hat{v}_q^*.$$

Note that, in another alternative embodiment, Step 31 can also be implemented according to another method: applying the voltage closed-loop regulation to the voltage instruction value $\hat{v}_p^*$ of the first AC signal, the voltage instruction value $\hat{v}_q^*$ of the second AC signal, and the fundamental voltage instruction value $V_{fund}$, respectively, and obtaining the sum of the outputs of the respective voltage closed-loop regulations as the output of the final voltage closed-loop regulation, i.e., the voltage regulation instruction value $v_{ref}$, so as to regulate the output voltage $V_{abc}$ of the inverter.

Figure 6:
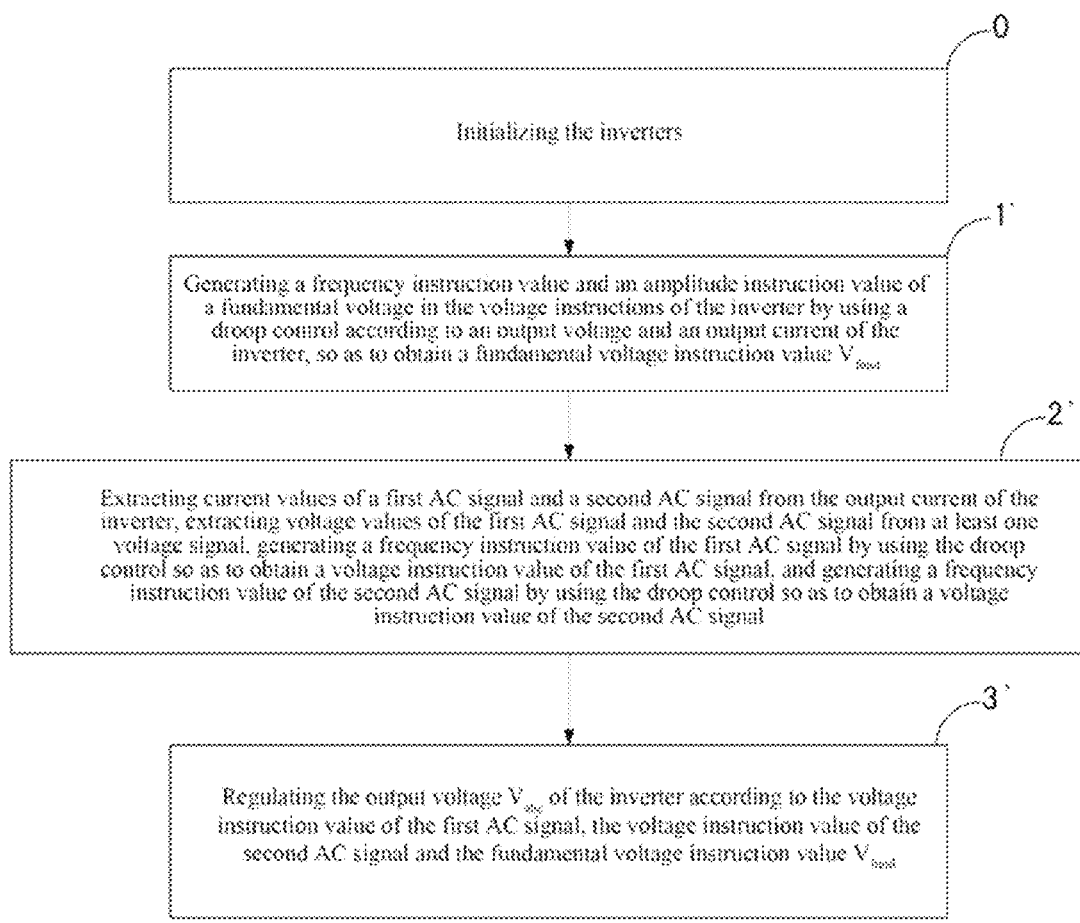
FIG. 6 is a flowchart of a secondary control method of the parallel inverters in micro grid according to the second embodiment of the present invention.
Figure 7:
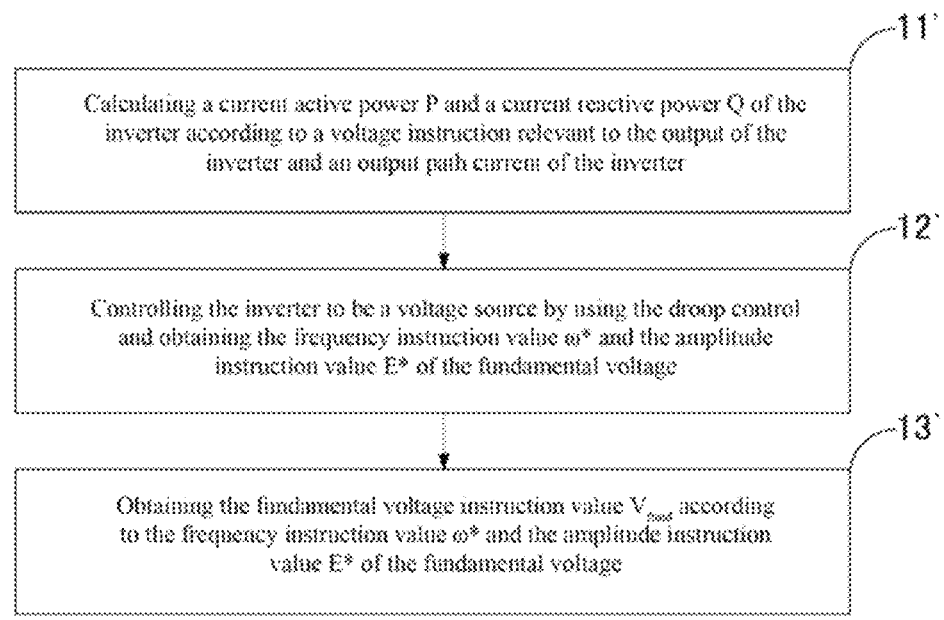
FIG. 7 is a flowchart of sub-steps of step 1' of the secondary control method according to the second embodiment of the present invention.
Figure 8:
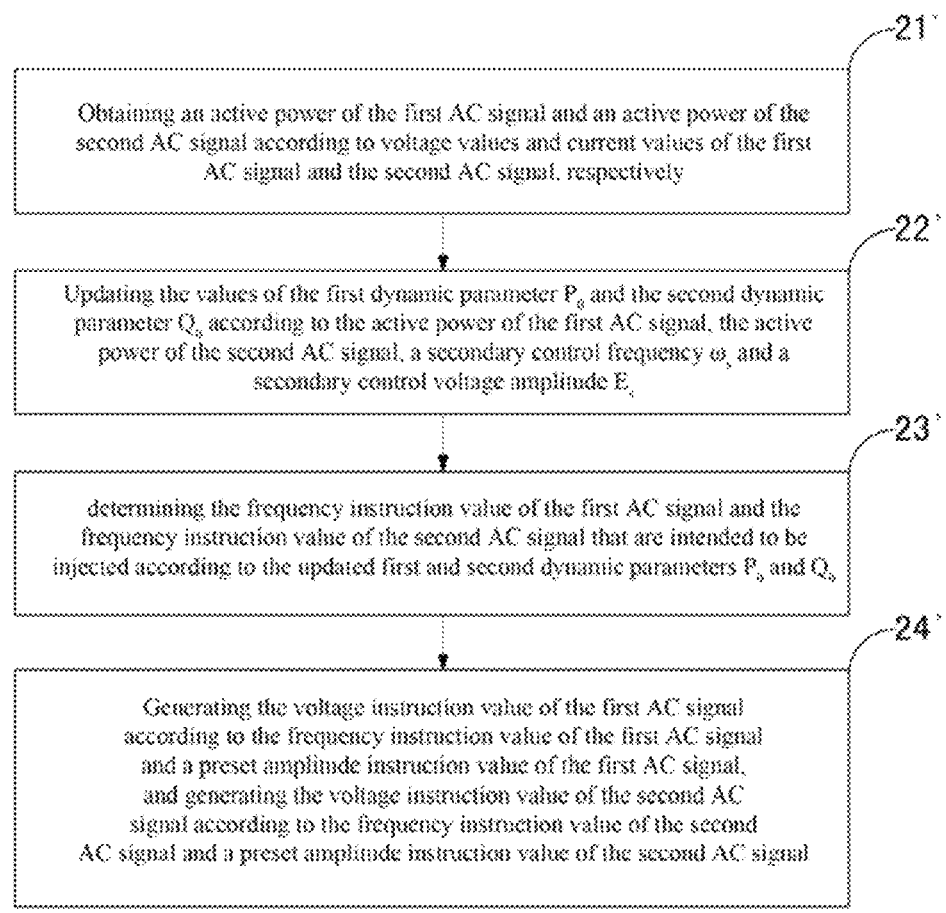
FIG. 8 is a flowchart of sub-steps of step 2' of the secondary control method according to the second embodiment of the present invention.

With reference to FIGS. 6 to 8, FIG. 6 is a flowchart of the secondary control method of the parallel inverters in micro grid according to a second embodiment of the present invention; FIG. 7 is a flowchart of sub-steps of step 1' of the secondary control method according to the second embodiment of the present invention; and FIG. 8 is a flowchart of sub-steps of step 2' of the secondary control method according to the second embodiment of the present invention. For each inverter in the micro grid, the secondary control is performed by using the secondary control method according to the present invention.

As shown in FIGS. 6 to 8, the secondary control method of the parallel inverters in micro grid according to the second embodiment of the present invention comprises:

Step 1': generating a frequency instruction value and an amplitude instruction value of a fundamental voltage in the voltage instructions of the inverter by using a droop control according to an output voltage and an output current of the inverter, so as to obtain a fundamental voltage instruction value $V_{fund}$;

Step 2': extracting current values of a first AC signal and a second AC signal from the output current of the inverter, extracting voltage values of the first AC signal and the second AC signal from at least one voltage signal, generating a frequency instruction value of the first AC signal by using the droop control so as to obtain a voltage instruction value $\hat{v}_p^*$ of the first AC signal, and generating a frequency instruction value of the second AC signal by using the droop control so as to obtain a voltage instruction value $\hat{v}_p^*$ of the second AC signal; and Step 3': regulating the output voltage $V_{abc}$ of the inverter according to the voltage instruction value $\hat{v}_p^*$ of the first AC signal, the voltage instruction value $\hat{v}_q^*$ of the second AC signal, and the fundamental voltage instruction value $V_{fund}$.

The at least one voltage signal is the output voltage of the inverter. That is, the voltage values of the first AC signal and the second AC signal are extracted from the output voltage of the inverter.

In another embodiment, the at least one voltage signal is the voltage instruction value $\hat{v}_p^*$ of the first AC signal and the voltage instruction value $\hat{v}_q^*$ of the second AC signal at previous time. Specifically, when the method is performed for the first time, the voltage values of the first AC signal and the second AC signal are initialized at first so as to perform the droop control. Then, the voltage instruction value of the first AC signal and the voltage instruction value of the second AC signal at current time are obtained according to the droop control. After that, when the method is performed every time, the voltage values of the first AC signal and the second AC signal at current time are determined according to the voltage instruction value of the first AC signal and the voltage instruction value of the second AC signal at previous time. That is, the voltage closed-loop regulation is applied to the voltage instruction value $\hat{v}_p^*$ of the first AC signal and the voltage instruction value $\hat{v}_q^*$ of the second AC signal.

Further, the secondary control method of the parallel inverters in micro grid according to the present invention further comprises a Step 0' prior to said Step 1', as described below.

Step 0': initializing the inverters, i.e., setting an initial value of a first dynamic parameter $P_0$, an initial value of a second dynamic parameter $Q_0$, an initial frequency $\omega_0$ and an initial voltage $E_0$, respectively, wherein the first dynamic parameter $P_0$ is a droop bias for generating the frequency of the fundamental voltage, and the second dynamic parameter $Q_0$ is a droop bias for generating the amplitude of the fundamental voltage, wherein the initial values of the first dynamic parameter $P_0$ and the second dynamic parameter $Q_0$ are only used in Step 1' and Step 2' which are performed for the first time.

Furthermore, said Step 1' of the secondary control method may further comprise:

Step 11': calculating a current active power P and a current reactive power Q of the inverter according to a voltage instruction relevant to the output of the inverter and an output path current of the inverter, wherein the voltage instruction relevant to the output of the inverter may be represented by the following parameters: the output voltage $V_{abc}$ of the inverter, the voltage $V_{PCC}$ of the AC bus in the micro grid, or the fundamental voltage instruction value $V_{fund}$; and the output path current of the inverter may be the output current $i_{abc}$ of the inverter or the current in front of a filtering capacitor in main circuits of the inverter;

Step 12': controlling the inverter to be a voltage source by using the droop control and obtaining the frequency instruction value $\omega^*$ and the amplitude instruction value $E^*$ of the fundamental voltage by using the following formulae:

$$\omega^* = \omega_0 - m \cdot (P - P_0),$$

$$E^* = G_{fE}((E_0 - E_f) - n \cdot (Q - Q_0)).$$

wherein m and n are the slopes of droop control lines and are both positive numbers; $G_{fE}$ is a regulator which may be an integral controller, a proportional-integral controller, or a controller having the similar regulating characteristics; $E_f$ is a voltage amplitude, and for example, may take the value of the amplitude $E_{PCC}$ of the fundamental voltage at PCC point of the AC bus in the micro grid, the amplitude $E_c$ of the fundamental voltage outputted from the inverter, or the amplitude instruction value $E^*$ corresponding to the fundamental voltage instruction value $V_{fund}$ at previous time; and Step 13': obtaining the fundamental voltage instruction value $V_{fund}$ according to the frequency instruction value $\omega^*$ and the amplitude instruction value $E^*$ of the fundamental voltage, by using the following formula:

$$v_{fund} = E^* \cos \omega^* t.$$

Furthermore, said Step 2' of the secondary control method may further comprise:

Step 21': obtaining an active power $\hat{P}_p$ of the first AC signal and an active power $\hat{P}_q$ of the second AC signal, respectively, according to voltage values and current values of the first AC signal and the second AC signal, wherein if this step is performed for the first time, both $\hat{P}_p$ and $\hat{P}_q$ are initialized into zero;

Step 22': updating the values of the first dynamic parameter $P_0$ and the second dynamic parameter $Q_0$ according to the active power of the first AC signal, the active power $\hat{P}_q$ of the second AC signal, a secondary control frequency $\omega_s$ and a secondary control voltage amplitude $E_s$, by using the following formulae:

$$P_0 = G_{s\omega}(\omega_r - \omega_s) + G_p \hat{P}_p,$$

$$Q_0 = G_{sE}(E_r - E_s) + G_q \hat{P}_q,$$

wherein $G_{s\omega}$ and $G_{sE}$ are regulators, such as integral regulators, proportional-integral regulators, or controllers having the similar regulating characteristics; $\omega_s$ is the secondary control frequency which for example, may take the value of the frequency $\omega_{PCC}$ of the fundamental voltage at PCC point of the AC bus in the micro grid, the frequency $\omega_c$ of the fundamental voltage outputted from the inverters, or the frequency instruction value $\omega^*$ of the fundamental voltage; and $E_s$ is the secondary control voltage amplitude which for example, may take the value of the amplitude $E_{PCC}$ of the fundamental voltage at PCC point of the AC bus in the micro grid, the amplitude $E_c$ of the fundamental voltage outputted from the inverter, or the amplitude instruction value E* of the fundamental voltage instruction value.

Wherein there are many method to obtain the frequency $\omega_{PCC}$ and the amplitude $E_{PCC}$ of the fundamental voltage at PCC point of the AC bus in the micro grid. For example, obtain the voltage $V_{PCC}$ at PCC point of the AC bus in the micro grid by means of sampling, and then extract the frequency and the amplitude of the voltage $V_{PCC}$; $\omega_r$, and $E_r$ are the rated frequency and the rated voltage amplitude, respectively, when the output of the inverter reaches a stable status; $G_p$ and $G_q$ are preset values, $G_p$ being a gain from the active power of the first AC signal to the first dynamic parameter $P_0$, and $G_q$ being a gain from the active power of the second AC signal to the second dynamic parameter $Q_0$.

It is noted that the orders of magnitudes of $G_p \hat{P}_p$ and $G_q \hat{P}_q$ are set to be the same as the orders of magnitudes of the dynamic parameters $P_0$ and $Q_0$.

Step 23': determining the frequency instruction value $\hat{\omega}_p^*$ of the first AC signal and the frequency instruction value $\hat{\omega}_q^*$ of the second AC signal that are intended to be injected according to the updated first and second dynamic parameters $P_0$ and $Q_0$, by using the following formulae:

$$\hat{\omega}_p^* = \hat{\omega}_{p0} - \hat{m} \cdot P_0,$$

$$\hat{\omega}_q^* = \hat{\omega}_{q0} - \hat{n} \cdot Q_0,$$

wherein $\hat{\omega}_{p0}$ and $\hat{\omega}_{q0}$ are preset frequency base values of the first AC signal and the second AC signal respectively, which cannot be identical in the same system, but must be higher than the fundamental frequency of the system. For example, $\hat{\omega}_{p0}$ and $\hat{\omega}_{q0}$ may be 100 Hz and 200 Hz, respectively, but the present invention is not limited thereto. $\hat{m}$ and $\hat{n}$ are droop slopes of the first AC signal and the second AC signal respectively, and are both positive numbers; and Step 24': generating the voltage instruction value $\hat{v}_p^*$ of the first AC signal according to the frequency instruction value $\hat{\omega}_p^*$ of the first AC signal and a preset amplitude instruction value $\hat{E}$ of the first AC signal, and generating the voltage instruction value $\hat{v}_q^*$ of the second AC signal according to the frequency instruction value $\hat{\omega}_q^*$ of the second AC signal and a preset amplitude instruction value $\hat{E}$ of the second AC signal, by using the following formulae:

$$\hat{v}_p^* = \hat{E} \cos \hat{\omega}_p^* t,$$

$$\hat{v}_q^* = \hat{E} \cos \hat{\omega}_q^* t,$$

wherein $\hat{E}$ is a preset amplitude instruction value of the first AC signal and the second AC signal.

There is a compromise among the amplitude values of the AC small-signals. If the amplitude value is too large, a serious distortion may occur in the output voltage. On the other hand, if the amplitude value is too small, it is hard to separate and extract the AC small-signals due to the interference and harmonic waves in the system. In this embodiment, the preset amplitude instruction value $\hat{E}$ is identical for the first AC signal and the second AC signal, i.e., being 1% of the amplitude of the fundamental rated voltage, such as, 2V. But the present invention is not limited thereto. In other embodiments, other appropriate values may be applied, as long as the values are approximately 1% of amplitude of the fundamental rated voltage.

In step 2', when the at least one voltage is the output voltage of the inverter, extracting the first AC signal and the second AC signal may be specifically implemented as follows: performing a dq conversion on the hybrid waveform of the output voltage and output current of the inverter by using the frequencies of the first AC signal and the second AC signal, respectively; filtering out the AC fundamental signal by using a low-pass filter; and obtaining the remaining DC signal to be as the signal in the dq coordinate system for the required AC signal. This method is simple but less accurate. Alternately, another method may be used to extract the first AC signal and the second AC signal, i.e., performing a dq conversion on the hybrid waveform of the output voltage and output current of the inverter by using the fundamental frequency; filtering out the first AC signal and the second AC signal by using a low-pass filter to obtain a fundamental signal; and subtracting the obtained fundamental signal from the original hybrid signal to obtain the first AC signal and the second AC signal. By comparison, this method is more complicated but more accurate. There are many methods for extracting two AC signals. Only two of them are enumerated in the present invention. However, those skilled in the art may understand that the present invention is not limited thereto. Note that the above is only a simple description of the methods for extracting the first AC signal and the second AC signal, details of which belong to the prior art and are not described here.

Step 3' further comprises:

Step 31': obtaining a voltage instruction value $v^*_{ref}$ of the inverter according to the voltage instruction value $\hat{v}_p^*$ of the first AC signal, the voltage instruction value $\hat{v}_q^*$ of the second AC signal, and the fundamental voltage instruction value $V_{fund}$, and obtaining a voltage regulation instruction value $v_{ref}$ by applying a voltage closed-loop regulation on $v^*_{ref}$ so as to regulate the output voltage $V_{abc}$ of the inverter, wherein $v^*_{ref}$ can be obtained by using the following formula:

$$v_{ref}^* = v_{fund} + \hat{v}_p^* + \hat{v}_q^*.$$

Note that, in another alternative embodiment, Step 31' can also be implemented according to another method: applying the voltage closed-loop regulation to the voltage instruction value $\hat{v}_p^*$ of the first AC signal, the voltage instruction value $\hat{v}_q^*$ of the second AC signal, and the fundamental voltage instruction value $V_{fund}$, respectively, and obtaining the sum of the outputs of the respective voltage closed-loop regulations as the output of the final voltage closed-loop regulation, i.e., the voltage regulation instruction value $v_{ref}$ so as to regulate the output voltage $V_{abc}$ of the inverter.

The secondary control method according to the first embodiment may only be applied for the reactive power sharing and the voltage secondary control when the line impedance matches, and can't be applied to the case where the line impedance does not match. On the other hand, the secondary control method according to the second embodiment may be applied for the reactive power sharing and the voltage secondary control in the case where the line impedance does not match, and thus may be used in more complicated practical environment and more practicable.

Figure 9:
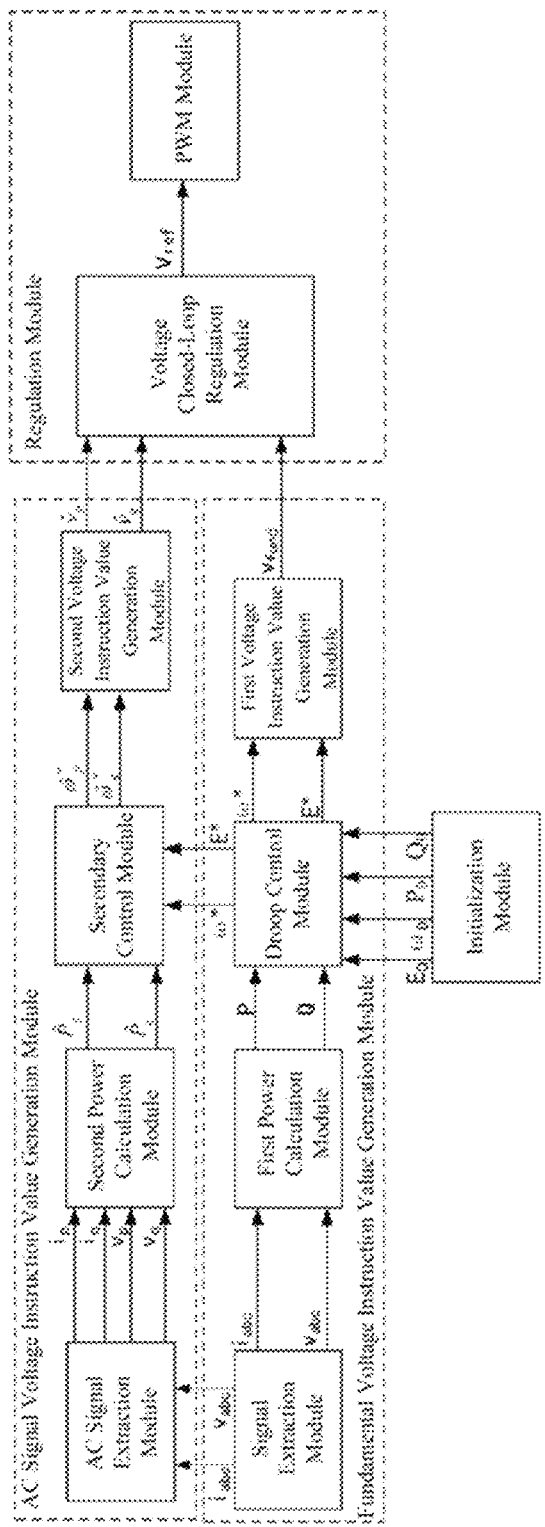
FIG. 9 is a block diagram of a secondary control apparatus of the parallel inverters in micro grid according to the present invention.

With reference to FIG. 9, FIG. 9 is a block diagram for a secondary control apparatus of the parallel inverters in micro grid according to the present invention. As shown in FIG. 9, the secondary control apparatus may comprise the following modules:

an initialization module, for initializing the inverter, i.e., setting an initial value of a first dynamic parameter $P_0$, an initial value of a second dynamic parameter $Q_0$, an initial frequency $\omega_0$ and an initial voltage $E_0$, respectively, wherein the first dynamic parameter $P_0$ is a droop bias for generating the frequency of a fundamental voltage, and the second dynamic parameter $Q_0$ is a droop bias for generating the amplitude of the fundamental voltage;

a fundamental voltage instruction value generation module, for generating a frequency instruction value and an amplitude instruction value of the fundamental voltage in the voltage instructions of the inverter by using a droop control according to an output voltage and an output current of the inverters, so as to obtain a fundamental voltage instruction value $V_{fund}$;

an AC signal voltage instruction value generation module, for extracting current values of a first AC signal and a second AC signal from the output current of the inverter, extracting voltage values of the first AC signal and the second AC signal from at least one voltage signal, generating a frequency instruction value of the first AC signal by using the droop control so as to obtain a voltage instruction value $\hat{v}_p^*$ of the first AC signal, and generating a frequency instruction value of the second AC signal by using the droop control so as to obtain a voltage instruction value $\hat{v}_q^*$ of the second AC signal; and a regulation module, for regulating the output voltage $V_{abc}$ of the inverter according to the voltage instruction value $\hat{v}_p^*$ of the first AC signal, the voltage instruction value $\hat{v}_q^*$ of the second AC signal, and the fundamental voltage instruction value $V_{fund}$.

At least one voltage signal is the output voltage of the inverter. That is, the voltage values of the first and second AC signals are extracted from the output voltage of the inverter.

In another embodiment, the at least one voltage signal is the voltage instruction value $\hat{v}_p^*$ of the first AC signal and the voltage instruction value $\hat{v}_q^*$ of the second AC signal at previous time. Specifically, when the method is performed for the first time, the voltage values of the first AC signal and the second AC signal are initialized at first so as to perform the droop control. Then, the voltage instruction value of the first AC signal and the voltage instruction value of the second AC signal at current time are obtained according to the droop control. After that, when the method is performed every time, the voltage values of the first AC signal and the second AC signal at current time are determined according to the voltage instruction value of the first AC signal and the voltage instruction value of the second AC signal at a previous time. That is, the voltage closed-loop regulation is applied to the voltage instruction value $\hat{v}_p^*$ of the first AC signal and the voltage instruction value $\hat{v}_q^*$ of the second AC signal.

Further, the fundamental voltage instruction value generation module may further comprise a signal extraction module, a first power calculation module, a droop control module, and a first voltage instruction value generation module:

Specifically, the signal extraction module may extract the output voltage $V_{abc}$ and the output current $i_{abc}$ of the inverter according to a hybrid waveform of the output voltage and output current of the inverter.

The first power calculation module may calculate a current active power P and a current reactive power Q of the inverter according to a voltage instruction relevant to the output of the inverter and an output path current of the inverter, wherein the voltage instruction relevant to the output of the inverter may be represented by the following parameters: the output voltage $V_{abc}$ of the inverter, the voltage $V_{PCC}$ of the AC bus in the micro grid, or the fundamental voltage instruction value $V_{fund}$; and the output path current of the inverter may be the output current $i_{abc}$ of the inverter or the current in front of a filtering capacitor in main circuits of the inverter.

The droop control module may control the inverter to be a voltage source by using the droop control and obtain the frequency instruction value $\omega^*$ and the amplitude instruction value $E^*$ of the fundamental voltage, and thereby obtain the fundamental voltage instruction value $V_{fund}$. For example, the frequency instruction value $\omega^*$ and the amplitude instruction value $E^*$ of the fundamental voltage may be obtained by using the following formulae:

$$\omega^* = \omega_0 - m \cdot (P - P_0),$$

$$E^* = G_{jE}((E_0 - E_{pcc}) - n \cdot (Q - Q_0)),$$

wherein m and n are the slopes of droop control lines and are both positive numbers; $G_{jE}$ is a regulator which may be an integral controller, a proportional-integral controller, or a controller having similar regulating characteristics; $E_f$ is a voltage amplitude, and for example, may take the value of the amplitude $E_{PCC}$ of the fundamental voltage at PCC point of the AC bus in the micro grid, the amplitude $E_c$ of the fundamental voltage outputted from the inverter, or the amplitude instruction value $E^*$ corresponding to the fundamental voltage instruction value $V_{fund}$ at previous time.

The first voltage instruction value generation module may obtain the fundamental voltage instruction value $V_{fund}$ according to the frequency instruction value $\omega^*$ and the amplitude instruction value $E^*$ of the fundamental voltage, by using the following formula:

$$v_{fund} = E^* \cos \omega^* t.$$

Furthermore, the AC signal voltage instruction value generation module may further comprise an AC signal extraction module, a second power calculation module, a secondary control module, and a second voltage instruction value generation module.

Specifically, the AC signal extraction module may extract a voltage value $v_p$ and a current value $i_p$ of the first AC signal, and a voltage value $v_q$ and a current value $i_q$ of the second AC signal.

The second power calculation module may obtain an active power $\hat{P}_p$ of the first AC signal and an active power $\hat{P}_q$ of the second AC signal according to the voltage value $v_p$ and the current value $i_p$ of the first AC signal and the voltage value $V_q$ and the current value $i_q$ of the second AC signal, respectively, wherein when the second power calculation module operates for the first time, both the active power $\hat{P}_p$ of the first AC signal and the active power $\hat{P}_q$ of the second AC signal are initialized to be zero. In this embodiment, the second power calculation module may further comprise a low-pass filter (not shown), through which the voltage value $v_p$ and current value $i_p$ of the first AC signal and the voltage value $V_q$ and current value $i_q$ of the second AC signal may be extracted from the sampled voltage and current outputted from the inverters.

The secondary control module may update the values of the first dynamic parameter $P_0$ and the second dynamic parameter $Q_0$ according to the active power $\hat{P}_p$ of the first AC signal, the active power $\hat{P}_q$ of the second AC signal, a secondary control frequency $\omega_s$, and a secondary control voltage amplitude $E_s$, by using the following formulae:

$$P_0 = G_{s\omega}(\omega_r - \omega_s) + G_p \hat{P}_p,$$

$$Q_0 = G_{sE}(E_r - E_s) + G_q \hat{P}_q,$$

wherein $G_{s\omega}$ and $G_{sE}$ are regulators, such as integral regulators, proportional-integral regulators, or controllers having similar regulating characteristics; $\omega_s$ is the secondary control frequency which for example, may take the value of the frequency $\omega_{PCC}$ of the fundamental voltage at PCC point of the AC bus in the micro grid, the frequency $\omega_c$ of the fundamental voltage outputted from the inverters, or the frequency instruction value $\omega^*$ of the fundamental voltage; and $E_s$ is the secondary control voltage amplitude which for example, may take the value of the amplitude $E_{PCC}$ of the fundamental voltage at PCC point of the AC bus in the micro grid, the amplitude $E_c$ of the fundamental voltage outputted from the inverter, or the amplitude instruction value $E^*$ of the fundamental voltage instruction value.

Wherein, there are many methods to obtain the frequency $\omega_{PCC}$ and the amplitude $E_{PCC}$ of the fundamental voltage at PCC point of the AC bus in the micro grid. For example, obtain the voltage $V_{PCC}$ at PCC point of the AC bus in the micro grid by means of sampling, and then extract the frequency and the amplitude of the voltage $V_{PCC}$; $\omega_r$ and $E_r$ are the rated frequency and the rated voltage amplitude, respectively, when the output of the inverter reaches a stable status; $G_p$ and $G_q$ are preset values, $G_p$ being a gain from the active power of the first AC signal to the first dynamic parameter $P_0$, and $G_q$ being a gain from the active power of the second AC signal to the second dynamic parameter $Q_0$.

It is noted that the orders of magnitudes of $G_p\hat{P}_p$ and $G_q\hat{P}_q$ are set to be the same as the orders of magnitudes of the dynamic parameters $P_0$ and $Q_0$ Then, the secondary control module may determine the frequency instruction value $\hat{\omega}_p^*$ of the first AC signal and the frequency instruction value $\hat{\omega}_q^*$ of the second AC signal that are intended to be injected according to the updated first and second dynamic parameters $P_0$ and $Q_0$, by using the following formulae:

$$\hat{\omega}_p^* = \hat{\omega}_{p0} - \hat{m} \cdot P_0,$$

$$\hat{\omega}_q^* = \hat{\omega}_{q0} - \hat{n} \cdot Q_0,$$

wherein $\hat{\omega}_{p0}$ and $\hat{\omega}_{q0}$ are preset frequency base values of the first AC signal and the second AC signal respectively, which cannot be identical in the same system, but must be higher than the fundamental frequency of the system. For example, $\hat{\omega}_{p0}$ and $\hat{\omega}_{q0}$ may be 100 Hz and 200 Hz, respectively, but the present invention is not limited thereto. $\hat{m}$ and $\hat{n}$ are droop slopes of the first AC signal and the second AC signal respectively, and are both positive numbers.

The second voltage instruction value generation module may generate the voltage instruction value $\hat{v}_p^*$ of the first AC signal according to the frequency instruction value $\hat{\omega}_p^*$ of the first AC signal and a preset amplitude instruction value $\hat{E}$ of the first AC signal, and generate the voltage instruction value $\hat{v}_q^*$ of the second AC signal according to the frequency instruction value $\hat{\omega}_q^*$ of the second AC signal and a preset amplitude instruction value $\hat{E}$ of the second AC signal, by using the following formulae:

$$\hat{v}_p^* = \hat{E} \cos \hat{\omega}_p^* t,$$

$$\hat{v}_q^* = \hat{E} \cos \hat{\omega}_q^* t,$$

wherein $\hat{E}$ is a preset amplitude instruction value of the first AC signal and the second AC signal.

There is a compromise among the amplitude values of the AC small-signals. If the amplitude value is too large, a serious distortion may occur in the output voltage. On the other hand, if the amplitude value is too small, it is hard to separate and extract the AC small-signals due to the interference and harmonic waves in the system. In this embodiment, the preset amplitude instruction value $\hat{E}$ is identical for the first AC signal and the second AC signal, i.e., being 1% of the amplitude of the fundamental rated voltage, such as, 2V. But the present invention is not limited thereto. In other embodiments, other appropriate values may be applied, as long as the values are approximately 1% of amplitude of the fundamental rated voltage.

Further, when the at least one voltage is the output voltage of the inverters, the AC signal extraction module may extract the first AC signal and the second AC signal from the hybrid waveform of the voltage and current outputted from the inverter, and obtain the voltage values and current values of the first AC signal and the second AC signal. Specifically, the methods for extracting the first AC signal and the second AC signal have been simply described above, and details will not be set forth here Furthermore, the regulation module may comprise a voltage closed-loop regulation module and a PWM (Pulse Width Modulation) module.

In an alternative embodiment, the voltage closed-loop regulation module may obtain a voltage instruction value $v^*_{ref}$ of the inverter according to the voltage instruction value $\hat{v}_p^*$ of the first AC signal, the voltage instruction value $\hat{v}_q^*$ of the second AC signal, and the fundamental voltage instruction value $V_{fund}$, so as to obtain a voltage regulation instruction value $v_{ref}$ by closed-loop regulating. The voltage regulation instruction value $v_{ref}$ is supplied to the PWM (Pulse Width Modulation) module. Wherein $v^*_{ref}$ may be obtained by using the following formula:

$$v_{ref}^* = v_{fund} + \hat{v}_p + \hat{v}_q.$$

In another alternative embodiment, the voltage closed-loop regulation module may obtain the voltage regulation instruction value $v_{ref}$ in another way. Supply the voltage instruction value $\hat{v}_p^*$ of the first AC signal, the voltage instruction value $\hat{v}_q^*$ of the second AC signal, and the fundamental voltage instruction value $V_{fund}$ to their respective voltage closed-loop regulations, and the sum of the outputs of the respective voltage closed-loop regulations is as the final output of the voltage closed-loop regulation module, i.e., the voltage regulation instruction value $v_{ref}$. The voltage regulation instruction value $v_{ref}$ is supplied to the PWM (Pulse Width Modulation) module.

The PWM (Pulse Width Modulation) module may regulate the output voltage $V_{abc}$ of the inverter according to the voltage regulation instruction value $v_{ref}$, wherein the output of the voltage closed-loop regulation module may be supplied to the PWM module so as to modulate and generate gate control signals for switching the transistors. Since $v_{ref}$ contains both a fundamental signal instruction and an AC small-signal instruction, the voltage outputted from the inverter contains both a fundamental component and a AC small-signal. Thus, the AC small-signal may be injected into the system.

Figure 10A:
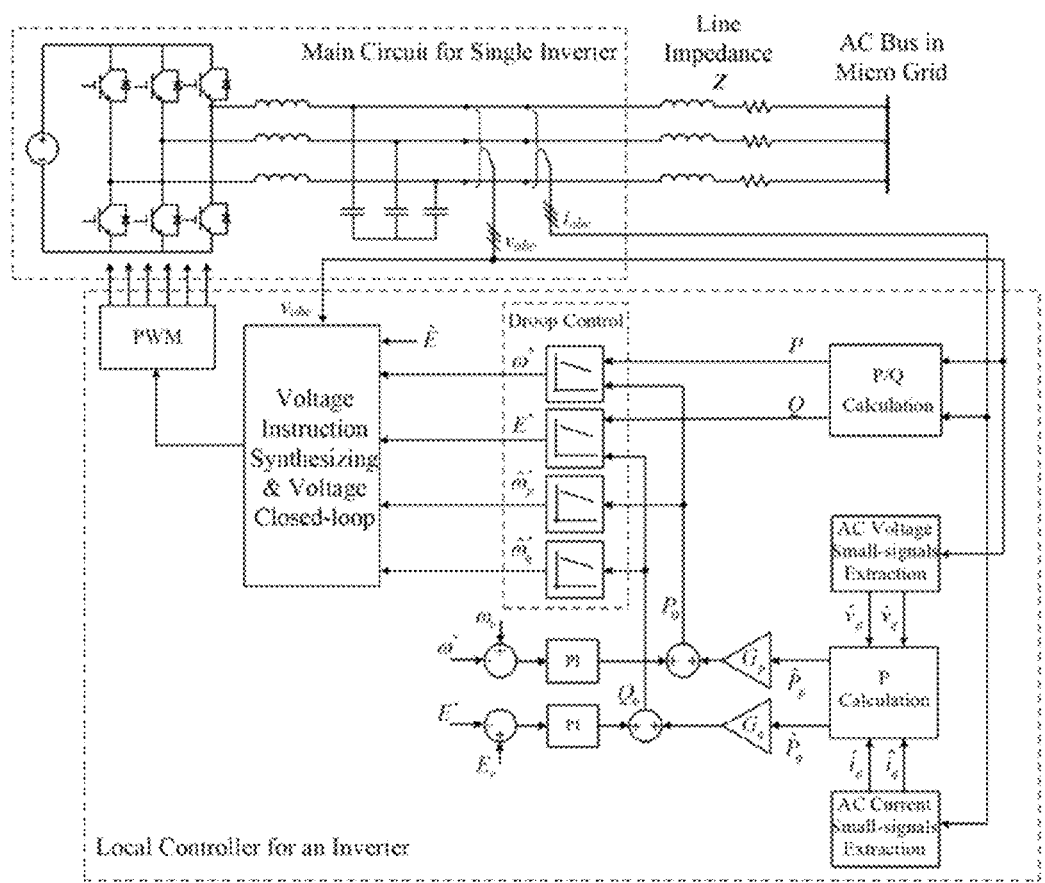
FIG. 10A is a schematic diagram of a circuit structure in an embodiment of the secondary control apparatus of the parallel inverters in micro grid according to the present invention.

FIG. 10A is a schematic diagram of a circuit structure for an embodiment of the secondary control apparatus of the parallel inverters in micro grid according to the present invention, which corresponds to the secondary control method according to the first embodiment. With reference to FIG. 10A, the secondary control apparatus includes a local controller for an inverter and a main circuit for a single inverter. The local controller for an inverter is electrically connected to the main circuit for a single inverter, and the local controller for an inverter comprises the above-mentioned secondary control apparatus, the principle of which has been set forth above in detail and will not be repeated here.

Figure 10B:
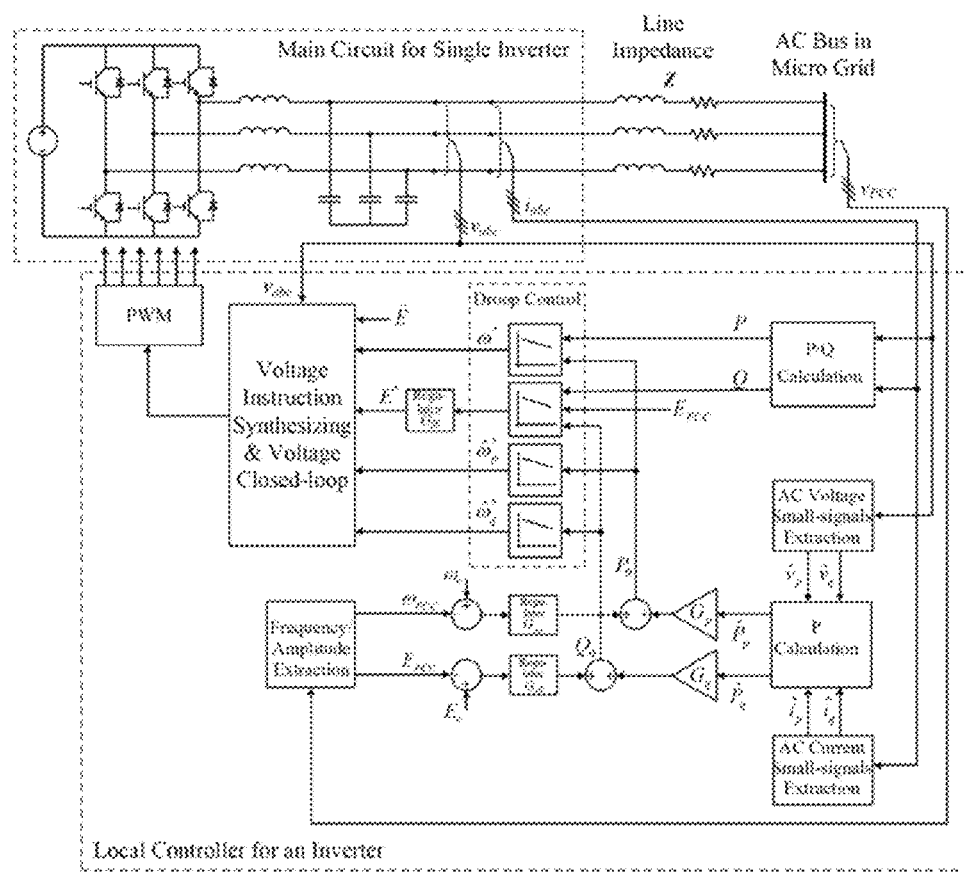
FIG. 10B is a schematic diagram of a circuit structure in another embodiment of the secondary control apparatus of the parallel inverters in micro grid according to the present invention.

FIG. 10B is a schematic diagram of a circuit structure for another embodiment of the secondary control apparatus of the parallel inverters in micro grid according to the present invention, which corresponds to the secondary control method according to the second embodiment. With reference to FIG. 10B, the secondary control apparatus includes a local controller for an inverter and a main circuit for a single inverter. The local controller for an inverter is electrically connected to the main circuit for a single inverter, and the local controller for an inverter comprises the above-mentioned secondary control apparatus, the principle of which has been set forth above in detail and will not be repeated here.

This method is independent of communication lines, because AC small-signals function as communication signals for synchronizing all parallel inverters in this method. There is a droop relationship between the active power and the frequency of the AC small-signals. This droop relationship allows the AC small-signals generated by all the parallel inverters to have the same frequency in a stable status, and thus further ensures the droop bias of fundamental voltages of all the parallel inverters to be identical. By means of this mechanism, all the parallel inverters may be synchronized and share the power uniformly. In addition, both the frequency and the amplitude of the fundamental voltage are regulated by controllers, and thus the frequency and voltage amplitude of the system can be restored to the rated values.

Specifically, the simulation model of the present invention is constituted by two inverters in parallel. Table 1 shows the simulation parameters.

TABLE 1

| Parameter | Value | Parameter | Value |
|---|---|---|---|
| $\omega_0$ | 50 Hz | $E_0$ | 200 V |
| $\omega_r$ | 50 Hz | $E_r$ | 200 V |
| $\hat{\omega}_{p0}$ | 100 Hz | $\hat{\omega}_{q0}$ | 100 Hz |
| m | $1 \cdot 10^{-4}$ Hz/W | n | $1 \cdot 10^{-3}$ V/var |
| $\hat{m}$ | $1 \cdot 10^{-4}$ Hz/W | $\hat{n}$ | $1 \cdot 10^{-4}$ V/Var |
| $k_{p\omega 1}$ | 1000 | $k_{i\omega 1}$ | $5 \cdot 10^{-6}$ |
| $k_{p\omega 2}$ | 1000 | $k_{i\omega 2}$ | $1.5 \cdot 10^{-5}$ |
| $k_{pE1}$ | 1000 | $k_{iE1}$ | $9 \cdot 10^{-5}$ |
| $k_{pE2}$ | 1000 | $k_{iE2}$ | $1.1 \cdot 10^{-4}$ |
| $G_p$ | 8000 | $G_q$ | 30000 |
| $\Delta P$ | 8 kW | $\Delta Q$ | 4 kVar |

Figure 11A:
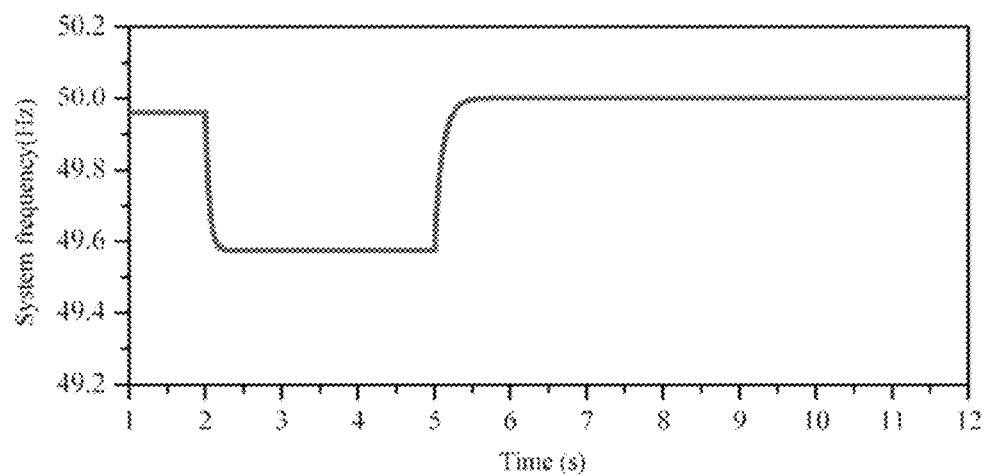
FIG. 11A shows the simulation waveform of the system frequency when secondary control is enabled after the active load is increased in the system by using a conventional distributed secondary control technology involving interconnected lines.
Figure 11B:
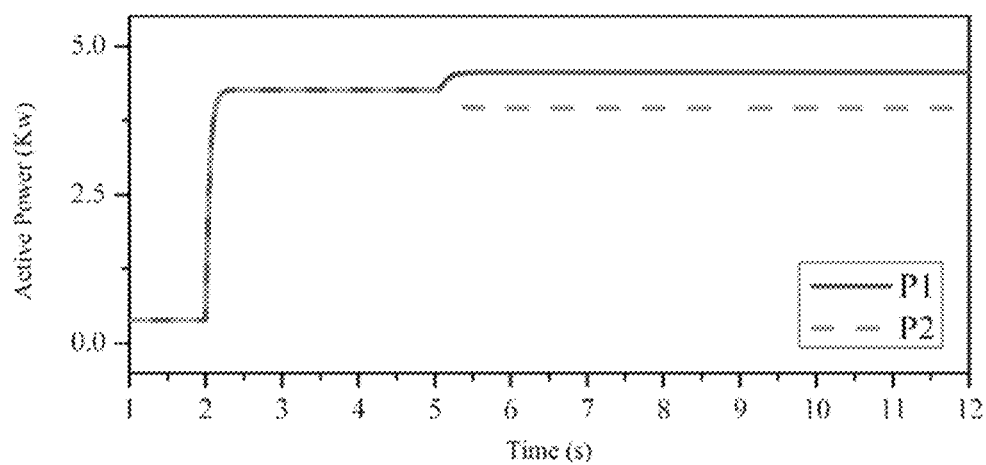
FIG. 11B shows the simulation waveforms of the active power of the parallel inverters when the secondary control is enabled after the active load is increased in the system by using a conventional distributed secondary control technology involving interconnected lines.
Figure 12A:
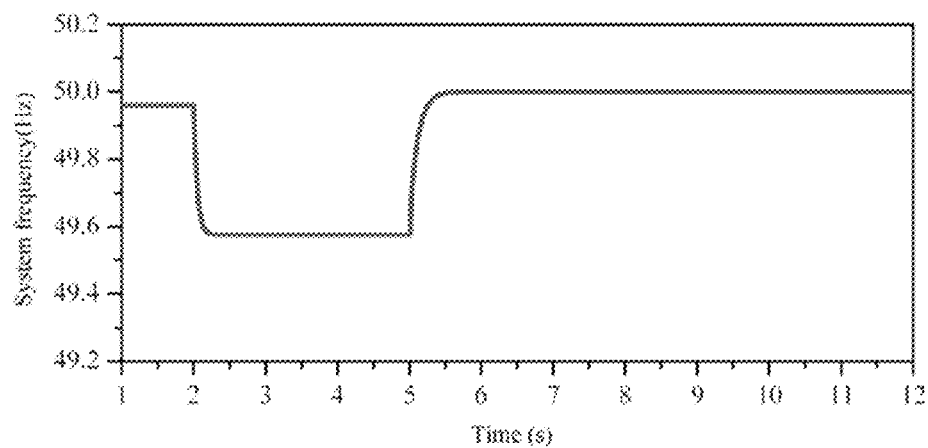
FIG. 12A shows the simulation waveform of the system frequency when the secondary control is enabled after the active load is increased in the system by using the secondary control technology according to the present invention.
Figure 12B:
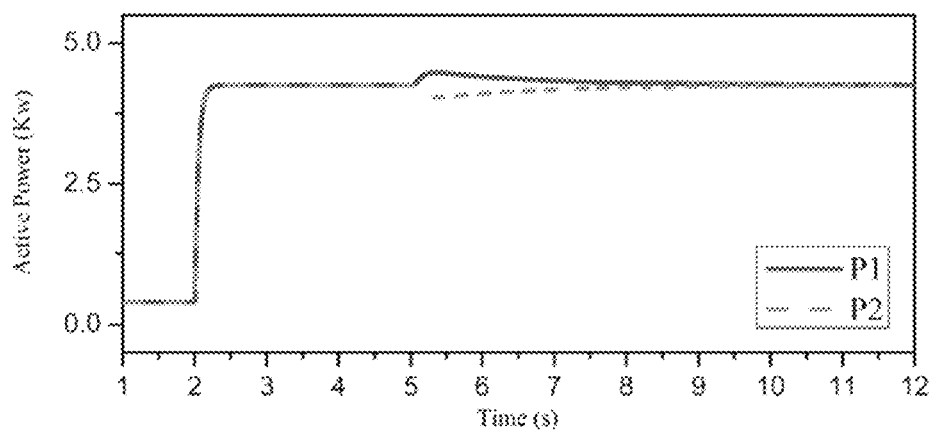
FIG. 12B shows the simulation waveforms of the active power of the parallel inverters when the secondary control is enabled after the active load is increased in the system by using the secondary control technology according to the present invention.
Figure 13A:
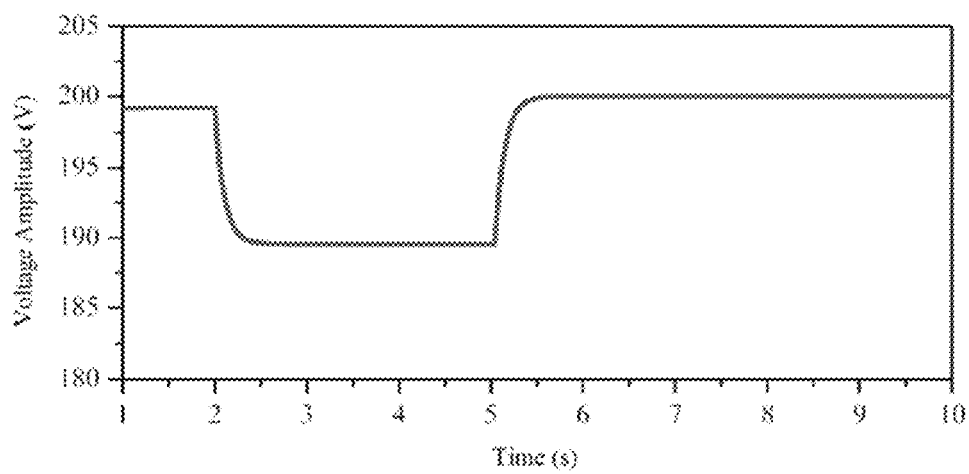
FIG. 13A shows the simulation waveform of the voltage amplitude when the secondary control is enabled after the reactive load is increased in the system by using a conventional distributed secondary control technology involving interconnected lines.
Figure 13B:
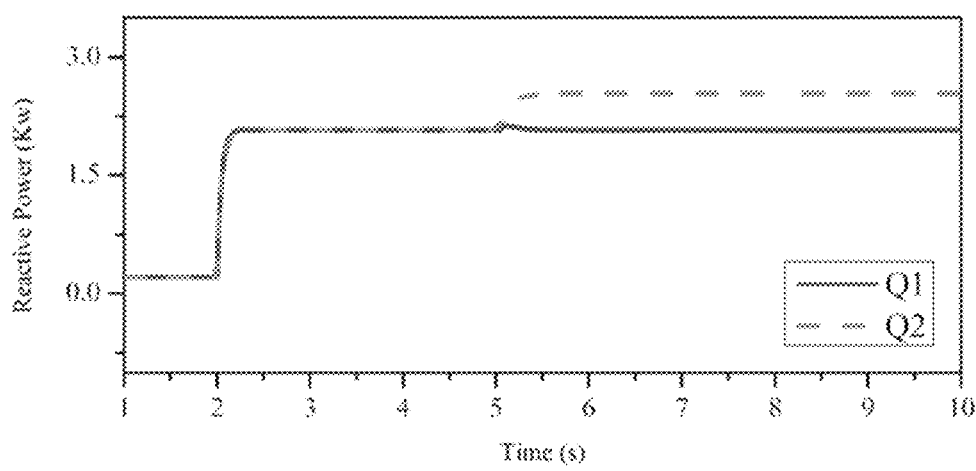
FIG. 13B shows the simulation waveforms of the reactive power of the parallel inverters when the secondary control is enabled after the reactive load is increased in the system by using a conventional distributed secondary control technology involving interconnected lines.
Figure 14A:
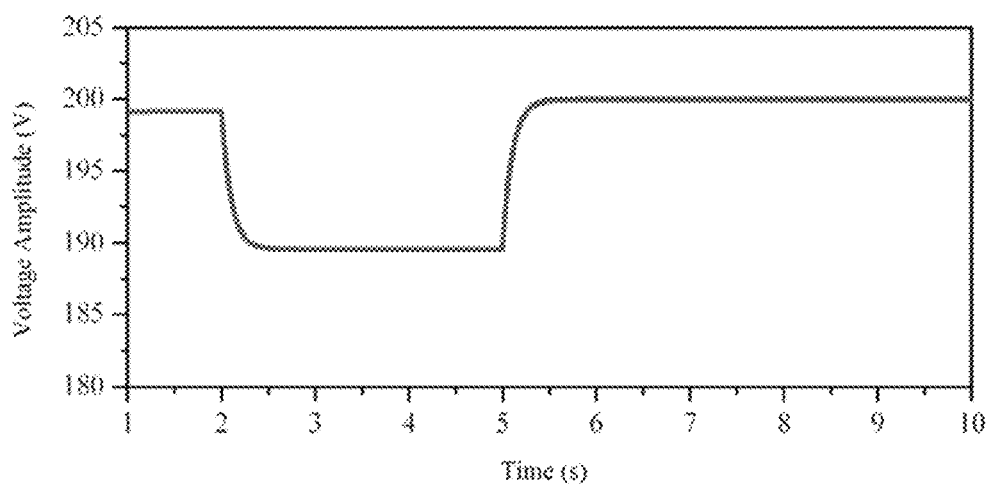
FIG. 14A shows the simulation waveform of the voltage amplitude when the secondary control is enabled after the reactive load is increased in the system by using the secondary control technology according to the present invention.
Figure 14B:
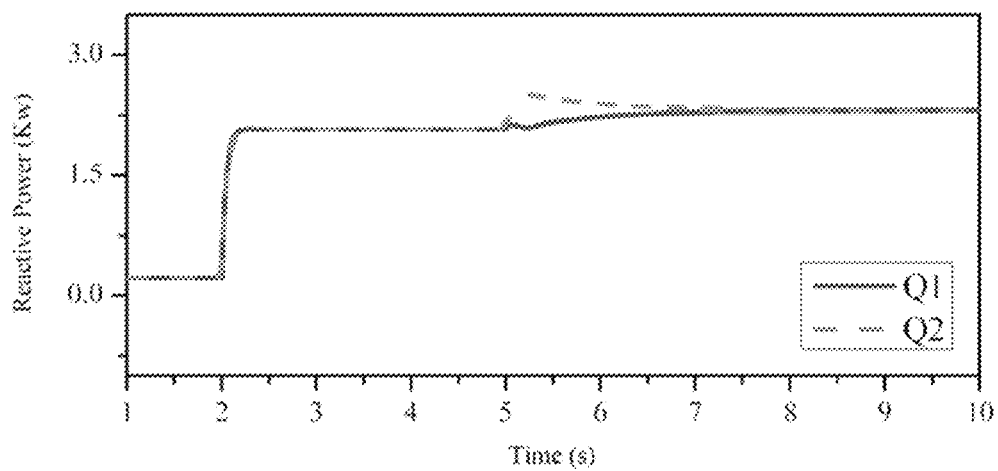
FIG. 14B shows the simulation waveforms of the reactive power of the parallel inverters when the secondary control is enabled after the reactive load is increased in the system using the secondary control technology according to the present invention.

To prove the improvements of the present method in terms of power sharing, we reproduced the effects of the conventional distributed secondary control technology involving interconnected lines. P1 and Q1 in the drawings represent the active power and the reactive power of an inverter, and P2 and Q2 represent the active power and the reactive power outputted of the other inverter. As shown in FIGS. 11A and 13A, they respectively illustrate the effects for eliminating the reduction in the frequency caused by the active load increase and eliminating the reduction in the voltage amplitude caused by the reactive load increase according to a conventional secondary control technology. FIG. 11A shows the simulation waveform of the system frequency when the secondary control is enabled after the active load is increased in the system by using the conventional distributed secondary control technology involving interconnected lines; FIG. 11B shows the simulation waveforms of the active power of the parallel inverters when the secondary control is enabled after the active load is increased in the system by using the conventional distributed secondary control technology involving interconnected lines; FIG. 13A shows the simulation waveforms of voltage amplitude when the secondary control is enabled after the reactive load is increased in the system by using the conventional distributed secondary control technology involving interconnected lines; FIG. 13B shows the simulation waveforms of the reactive power of the parallel inverters when the secondary control is enabled after the reactive load is increased in the system by using the conventional distributed secondary control technology involving interconnected lines. As shown in FIGS. 12A, 14A, they illustrate the simulation waveforms of the secondary control technology according to the present invention, and respectively illustrate the effects for eliminating the reduction in frequency caused by the active load increase and eliminating the reduction in voltage amplitude caused by the reactive load increase. FIG. 12A shows the simulation waveform of the system frequency when the secondary control is enabled after the active load is increased in the system by using the secondary control technology according to the present invention; FIG. 12B shows the simulation waveforms of the active power of the parallel inverters when the secondary control is enabled after the active load is increased in the system by using the secondary control technology according to the present invention; FIG. 14A shows the simulation waveform of the voltage amplitude when the secondary control is enabled after the reactive load is increased in the system by using the secondary control technology according to the present invention; FIG. 14B shows the simulation waveforms of the reactive power of the parallel inverters when the secondary control is enabled after the reactive load is increased in the system by using the secondary control technology according to the present invention.

During the simulation, the load increases at the $2^{nd}$ second and the secondary control is enabled at the $5^{th}$ second. As can be seen from the simulation waveforms, the increase of active load and the increase of reactive load will result in a reduction in system frequency and a reduction in voltage amplitude, respectively. After the conventional distributed secondary control involving interconnected lines is enabled, the system frequency and the voltage amplitude may be restored to the rated values. However, the power cannot be shared in a stable status due to slight differences between the control parameters of the two inverters. On the contrary, the solution provided by the present invention can not only restore the system frequency and voltage amplitude to the rated values, but also accurately achieve power sharing.

The experimental platform for verifying the present method consists of two inverters of the same type (MWINV-9R144) in parallel. Table 2 shows the experimental parameters.

TABLE 2

| Parameter | Value | Parameter | Value |
|---|---|---|---|
| $\omega_0$ | 50 Hz | $E_0$ | 200 V |
| $\omega_r$ | 50 Hz | $E_r$ | 200 V |
| $\hat{\omega}_{p0}$ | 100 HZ | $\hat{\omega}_{q0}$ | 100 Hz |
| m | $5 \cdot 10^{-4}$ Hz/W | n | $5 \cdot 10^{-3}$ V/Var |
| $\hat{m}$ | $1 \cdot 10^{-4}$ Hz/W | $\hat{n}$ | $1 \cdot 10^{-4}$ V/Var |
| $k_{p\omega}$ | 1000 | $k_{i\omega}$ | 10 |
| $k_{pE}$ | 100 | $k_{iE}$ | 10 |
| $G_p$ | 2000 | $G_q$ | 2000 |
| $\Delta P$ | 1.2 kW | $\Delta Q$ | 1.6 kVar |

Figure 15A:
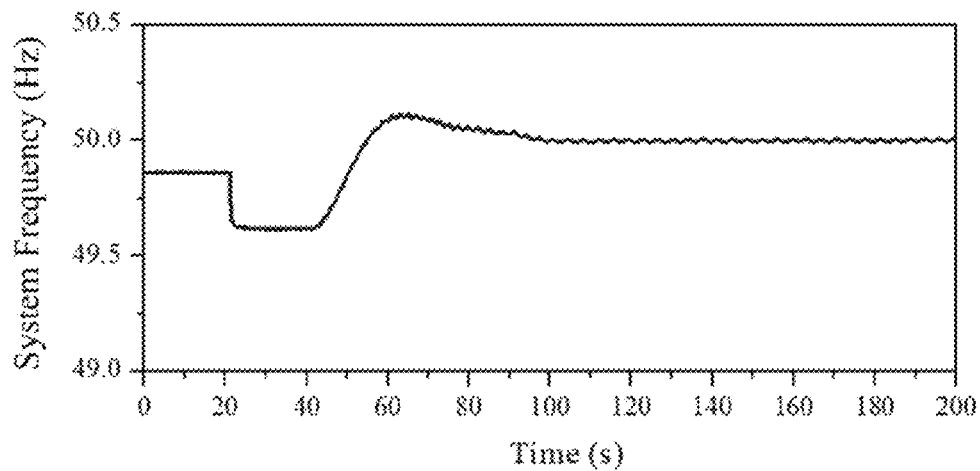
FIG. 15A shows the experimental waveform of the system frequency when the secondary control is enabled after the active load is increased in the system by using the secondary control technology according to the present invention.
Figure 15B:
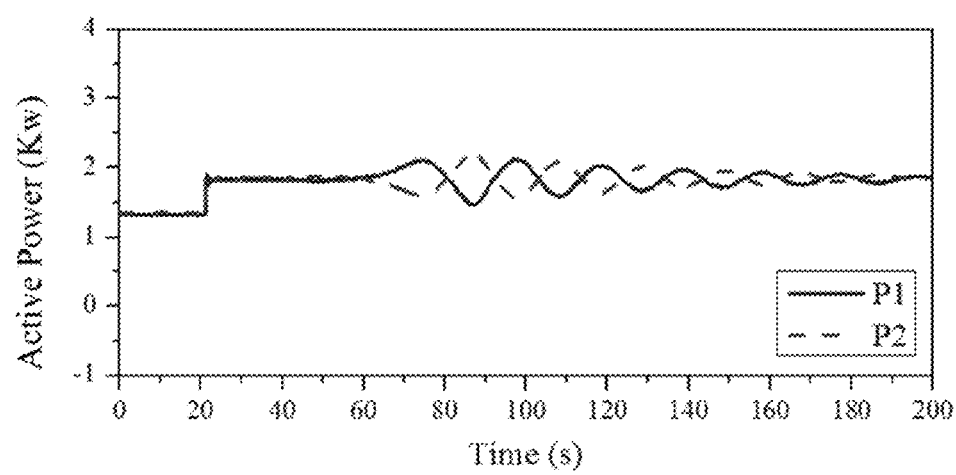
FIG. 15B shows the experimental waveforms of the active power of the parallel inverters when the secondary control is enabled after the active load is increased in the system by using the secondary control technology according to the present invention.
Figure 16A:
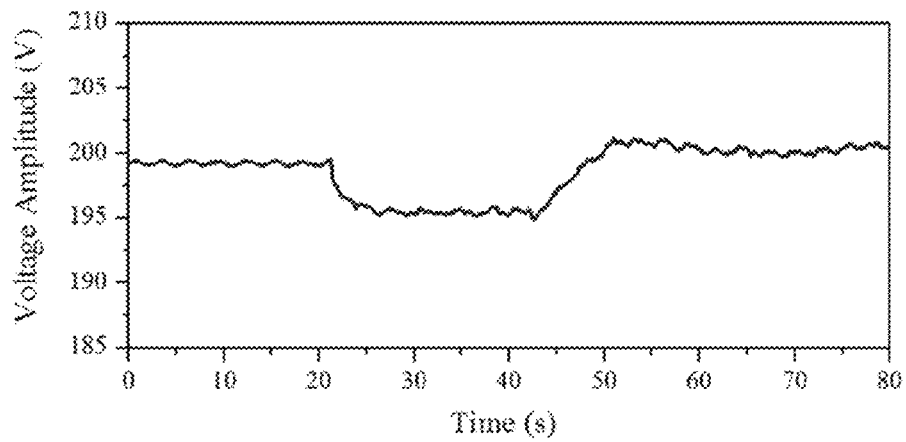
FIG. 16A shows the experimental waveform of the voltage amplitude when the secondary control is enabled after the reactive load is increased in the system by using the secondary control technology according to the present invention.
Figure 16B:
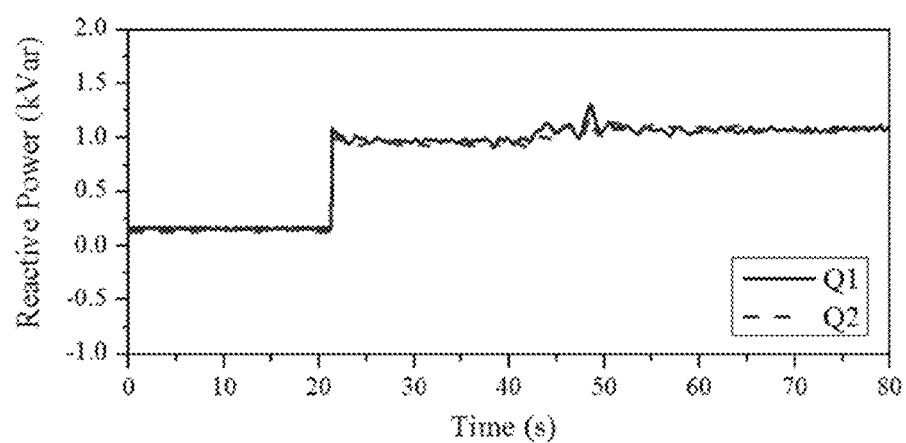
FIG. 16B shows the experimental waveform of the reactive power of the parallel inverters when the secondary control is enabled after the reactive load is increased in the system by using the secondary control technology according to the present invention.

FIGS. 15A to 16B illustrate the experimental waveforms of the secondary control technology according to the present invention, and respectively illustrate the elimination for the reduction in frequency caused by the active load increase and elimination for the reduction in voltage amplitude caused by the reactive load increase. FIG. 15A shows the experimental waveform of the system frequency when the secondary control according to the present invention is enabled after the active load is increased; FIG. 15B shows the experimental waveform of the active power of the parallel inverters when the secondary control according to the present invention is enabled after the active load is increased; FIG. 16A shows the experimental waveform of the voltage amplitude when the secondary control according to the present invention is enabled after the reactive load is increased; FIG. 16B shows the experimental waveform of the reactive power of the parallel inverters when the secondary control according to the present invention is enabled after the reactive load is increased.

In the experiments shown in FIGS. 15A to 15B, the load increases at the $17^{th}$ second and the secondary control is enabled at the $33^{rd}$ second; in the experiments shown in FIGS. 16A to 16B, the load increases at the $17^{th}$ second and the secondary control is enabled at the $35^{th}$ second. As can be seen from the experimental waveforms, the increase of active load and the increase of reactive load will result in a reduction in system frequency and a reduction in voltage amplitude, respectively. After the secondary control according to the present invention is enabled, the system frequency and voltage amplitude can be restored to the rated values, and the power may be shared among the parallel inverters.

Noted that the above embodiments are used only to illustrate the present invention but not to limit the technical solution described in the present invention; meanwhile, although the present invention has been disclosed in detail with reference to the above embodiments in the present description, those of ordinary skills in the art should appreciate that they still can make amendments or equivalent substitutions to the present invention; therefore, all technical solutions not departing from the spirit and scope of the present invention and the improvements thereof should all fall within the scopes of protection of the appended claims of the present invention.

What is claimed is:

1. A secondary control method of parallel inverters in micro grid, comprising:
   Step 1: generating a frequency instruction value and an amplitude instruction value of a fundamental voltage in the voltage instructions of the inverter by using a droop control according to an output voltage and an output current of the inverter, so as to obtain a fundamental voltage instruction value $V_{fund}$;
   Step 2: extracting current values of a first AC signal and a second AC signal from the output current of the inverter, extracting voltage values of the first AC signal and the second AC signal from at least one voltage signal, generating a frequency instruction value of the first AC signal by using the droop control so as to obtain a voltage instruction value $\hat{v}_p^*$ of the first AC signal, and generating a frequency instruction value of the second AC signal by using the droop control so as to obtain a voltage instruction value $\hat{v}_q^*$ of the second AC signal; and
   Step 3: regulating the output voltage of the inverter according to the voltage instruction value $\hat{v}_p^*$ of the first AC signal, the voltage instruction value $\hat{v}_q^*$ of the second AC signal, and the fundamental voltage instruction value $V_{fund}$.

2. The secondary control method according to claim 1, wherein the at least one voltage signal is the output voltage of the inverter, or the at least one voltage signal is a voltage instruction value of the first AC small-signal and a voltage instruction value of the second AC small-signal at previous time.

3. The secondary control method according to claim 2, wherein before said Step 1, the method further comprises a Step 0: initializing the inverter, to set an initial value of a first dynamic parameter $P_0$, an initial value of a second dynamic parameter $Q_0$, an initial frequency $\omega_0$ and an initial voltage $E_0$ respectively, wherein the first dynamic parameter $P_0$ is a droop bias for generating the frequency of the fundamental voltage, and the second dynamic parameter $Q_0$ is a droop bias for generating the amplitude of the fundamental voltage.

4. The secondary control method according to claim 3, wherein said Step 1 comprises:
   Step 11: calculating a current active power P and a current reactive power Q of the inverter according to a voltage instruction relevant to the output of the inverter and an output path current of the inverter;
   Step 12: controlling the inverter to be a voltage source by using the droop control and obtaining the frequency instruction value $\omega^*$ and the amplitude instruction value $E^*$ of the fundamental voltage by using the following formulae:

$$\omega^* = \omega_0 - m \cdot (P - P_0),$$

$$E^* = G_{fE}((E_0 - E_f) - n \cdot (Q - Q_0)),$$

wherein m and n are the slopes of droop control lines and are both positive numbers, $G_{fE}$ is a regulator, and, $E_r$ is a voltage amplitude; and
   Step 13: obtaining the fundamental voltage instruction value $V_{fund}$ according to the frequency instruction value $\omega^*$ and the amplitude instruction value $E^*$ of the fundamental voltage.

5. The secondary control method according to claim 3, wherein said Step 2 comprises:
   Step 21: obtaining an active power $\hat{P}_p$ of the first AC signal and an active power $\hat{P}_q$ of the second AC signal respectively, according to voltage values and current values of the first AC signal and the second AC signal;
   Step 22: updating the values of the first dynamic parameter $P_0$ and the second dynamic parameter $Q_0$ according to the active power $\hat{P}_p$ of the first AC signal, the active power $\hat{P}_q$ of the second AC signal, a secondary control frequency $\omega^*$ and a secondary control voltage amplitude $E_s$;
   Step 23: determining the frequency instruction value $\omega_p^*$ of the first AC signal and the frequency instruction value $\hat{\omega}_q^*$ of the second AC signal that are intended to be injected; and
   Step 24: generating the voltage instruction value $\hat{v}_p^*$ of the first AC signal according to the frequency instruction value $\hat{\omega}_p^*$ of the first AC signal and a preset amplitude instruction value $\hat{E}$ of the first AC signal, and generating the voltage instruction value $\hat{v}_q^*$ of the second AC signal according to the frequency instruction value $\hat{\omega}_q^*$ of the second AC signal and a preset amplitude instruction value $\hat{E}$ of the second AC signal.

6. The secondary control method according to claim 5, wherein said Step 22 are performed by using the following formulae:

$$P_0 = G_{s\omega}(\omega_r - \omega_s) + G_p \hat{P}_p,$$

$$Q_0 = G_{sE}(E_r - E_s) + G_q \hat{P}_q,$$

wherein, $\omega_r$ and $E_r$ are a rated frequency and a rated voltage amplitude respectively, when the output of the inverter reaches a stable status; $G_{s\omega}$ and $G_{sE}$ are regulators; $G_p$ is a gain from the active power of the first AC signal to the first dynamic parameter $P_0$; and $G_q$ is a gain from the active power of the second AC signal to the second dynamic parameter $Q_0$.

7. The secondary control method according to claim 5, wherein said Step 23 is performed by using the following formulae:

$$\hat{\omega}_p^* = \hat{\omega}_{p0} - \hat{m} \cdot P_0,$$

$$\hat{\omega}_q^* = \hat{\omega}_{q0} - \hat{n} \cdot Q_0,$$

wherein $\hat{m}$ and $\hat{n}$ are droop slopes of the first AC signal and the second AC signal respectively, and are both positive numbers, and $\hat{\omega}_{p0}$ and $\hat{\omega}_{q0}$ are preset frequency base values of the first AC signal and the second AC signal respectively.

8. The secondary control method according to claim 5, wherein if said Step 21 is performed for the first time, the active power $\hat{P}_p$ of the first AC signal and the active power $\hat{P}_q$ of the second AC signal are both zero.

9. The secondary control method according to claim 6, wherein the orders of magnitudes of $G_p\hat{P}_p$ and $G_q\hat{P}_q$ are set to be the same as the orders of magnitudes of the dynamic parameters $P_0$ and $Q_0$.

10. The secondary control method according to claim 1, wherein the secondary control method is performed for all the inverters in micro grid.

11. A secondary control apparatus of parallel inverters in micro grid, comprising:
a fundamental voltage instruction value generation module, for generating a frequency instruction value and an amplitude instruction value of the fundamental voltage in the voltage instructions of the inverter by using a droop control according to an output voltage and an output current of the inverter, so as to obtain a fundamental voltage instruction value $V_{fund}$;
an AC signal voltage instruction value generation module, for extracting current values of a first AC signal and a second AC signal from the output current of the inverter, extracting voltage values of the first AC signal and the second AC signal from at least one voltage signal, generating a frequency instruction value of the first AC signal by using the droop control so as to obtain a voltage instruction value of the first AC signal, and generating a frequency instruction value of the second AC signal by using the droop control so as to obtain a voltage instruction value of the second AC signal; and
a regulation module, for regulating the output voltage of the inverter according to the voltage instruction value of the first AC signal, the voltage instruction value of the second AC signal, and the fundamental voltage instruction value $V_{fund}$.

12. The secondary control apparatus according to claim 11, wherein the at least one voltage signal is the output voltage of the inverter, or the at least one voltage signal is a voltage instruction value of the first AC small-signal and a voltage instruction value of the second AC small-signal at previous time.

13. The secondary control apparatus according to claim 12, further comprising an initialization module for initializing the inverter, to set an initial value of a first dynamic parameter $P_0$, an initial value of a second dynamic parameter $Q_0$, an initial frequency $\omega_0$ and an initial voltage $E_0$ respectively, wherein the first dynamic parameter $P_0$ is a droop bias for generating the frequency of the fundamental voltage, and the second dynamic parameter $Q_0$ is a droop bias for generating the amplitude of the fundamental voltage.

14. The secondary control apparatus according to claim 13, wherein the fundamental voltage instruction value generation module comprises:
a first power calculation module, for calculating a current active power P and a current reactive power Q of the inverter according to a voltage instruction relevant to the output of the inverter and an output path current of the inverter;
a droop control module, for controlling the inverter to be a voltage source by using the droop control and obtaining the frequency instruction value $\omega^*$ and the amplitude instruction value $E^*$ of the fundamental voltage, wherein the frequency $\omega^*$ and the amplitude $E^*$ of fundamental voltage are obtained by using the following formulae:

$$\omega^* = \omega_0 - m \cdot (P - P_0),$$

$$E^* = G_{fE}((E_0 - E_f) - n \cdot (Q - Q_0)),$$

wherein m and n are the slopes of droop control lines and are both positive numbers; $G_{fE}$ is a regulator; and $E_f$ is a voltage amplitude; and
a first voltage instruction value generation module, for obtaining the fundamental voltage instruction value $V_{fund}$ according to the frequency instruction value $\omega^*$ and the amplitude instruction value $E^*$ of the fundamental voltage.

15. The secondary control apparatus according to claim 13, wherein the AC signal voltage instruction value generation module comprises:
an AC signal extraction module, for obtaining voltage values and current values of the first AC signal and the second AC signal according to the at least one voltage signal and the output current of the inverters;
a second power calculation module, for obtaining the active power $\hat{P}_p$ of the first AC signal and the active power $\hat{P}_q$ of the second AC signal according to the voltage values and the current values of the first AC signal and the second AC signal respectively;
a secondary control module, for updating the values of the first dynamic parameter $P_0$ and the second dynamic parameter $Q_0$ according to the active power $\hat{P}_p$ of the first AC signal, the active power a of the second AC signal, a secondary control frequency $\omega_s$, and a secondary control voltage amplitude $E_s$, and determining a frequency instruction value $\hat{\omega}_p^*$ of the first AC signal and a frequency instruction value $\hat{\omega}_q^*$ of the second AC signal that are intended to be injected according to the updated first and second dynamic parameters $P_0$ and $Q_0$; and
a second voltage instruction value generation module, for generating the voltage instruction value of the first AC signal according to the frequency instruction value of the first AC signal and a preset amplitude instruction value $\hat{E}$ of the first AC signal, and generating the voltage instruction value of the second AC signal according to the frequency instruction value of the second AC signal and a preset amplitude instruction value $\hat{E}$ of the second AC signal.

16. The secondary control apparatus according to claim 15, wherein the secondary control module updates the values of the first dynamic parameter $P_0$ and the second dynamic parameter $Q_0$ by using the following formulae:

$$P_0 = G_{s\omega}(\omega_r - \omega_s) + G_p\hat{P}_p,$$

$$Q_0 = G_{sE}(E_r - E_s) + G_q\hat{P}_q,$$

wherein $\omega_r$ and $E_r$ are a rated frequency and a rated voltage amplitude respectively, when the output of the inverter reaches a stable status; $G_{s\omega}$ and $G_{sE}$ are regulators; $G_p$ is a gain from the active power of the first AC signal to the first dynamic parameter $P_0$; and $G_q$ is a gain from the active power of the second AC signal to the second dynamic parameter $Q_0$.

17. The secondary control apparatus according to claim 15, wherein the secondary control module determines the frequency instruction value $\hat{\omega}_p^*$ of the first AC signal and the frequency instruction value $\hat{\omega}_q^*$ of the second AC signal that are intended to be injected by using the following formulae:

$$\hat{\omega}_p^* = \hat{\omega}_{p0} - \hat{m} \cdot P_0,$$

$$\hat{\omega}_q^* = \hat{\omega}_{q0} - \hat{n} \cdot Q_0,$$

wherein $\hat{m}$ and $\hat{n}$ are droop slopes of the first AC signal and the second AC signal respectively, and are both positive numbers, and $\hat{\omega}_{p0}$ and $\hat{\omega}_{q0}$ are preset frequency base values of the first AC signal and the second AC signal respectively.

18. The secondary control apparatus according to claim 15, wherein if the second power calculation module operates for the first time, the active power $\hat{P}_p$ of the first AC signal and the active power $\hat{P}_q$ of the second AC signal are both set to be zero.

19. The secondary control apparatus according to claim 16, wherein the orders of magnitudes of $G_p\hat{P}_p$ and $G_q\hat{P}_q$ are set to be the same as the orders of magnitudes of the dynamic parameters $P_0$ and $Q_0$.

20. The secondary control apparatus according to claim 11, wherein the regulation module comprises:
- a voltage closed-loop regulation module, for obtaining a voltage regulation instruction value $v_{ref}$ according to the voltage instruction value of the first AC signal, the voltage instruction value of the second AC signal and the fundamental voltage instruction value $V_{fund}$; and
- a pulse width modulation module, for regulating the output voltage of the inverter according to the voltage regulation instruction value $v_{ref}$.

\* \* \* \* \*